US012646344B1

(12) United States Patent
Carson et al.

(10) Patent No.: US 12,646,344 B1
(45) Date of Patent: Jun. 2, 2026

(54) MACHINE LEARNING FRAMEWORK TO DETECT AND MONITOR COMPLIANCE MATTERS

(71) Applicant: EchoTwin AI, Inc., Boca Raton, FL (US)

(72) Inventors: Christopher Carson, Boca Raton, FL (US); Sergey Sukov, Livermore, CA (US); Bo Shen, Fremont, CA (US)

(73) Assignee: EchoTwin AI, Inc., Boca Raton, FL (US)

( * ) Notice: Subject to any disclaimer, the term of this patent is extended or adjusted under 35 U.S.C. 154(b) by 0 days.

(21) Appl. No.: 19/313,189

(22) Filed: Aug. 28, 2025

Related U.S. Application Data

(60) Provisional application No. 63/770,777, filed on Mar. 12, 2025.

(51) Int. Cl.
  *G06V 20/70* (2022.01)
  *G06N 20/20* (2019.01)
  *G06V 20/52* (2022.01)
(52) U.S. Cl.
  CPC ............. *G06V 20/70* (2022.01); *G06N 20/20* (2019.01); *G06V 20/52* (2022.01); *G06V 2201/07* (2022.01)
(58) Field of Classification Search
  CPC .... G06V 20/70; G06V 20/52; G06V 2201/07; G06N 20/20
  See application file for complete search history.

(56) References Cited

U.S. PATENT DOCUMENTS

| | | | |
|---|---|---|---|
| 11,003,919 B1 | 5/2021 | Ghadiok et al. | |
| 2019/0164019 A1* | 5/2019 | Djiofack | G08B 13/22 |
| 2025/0299463 A1* | 9/2025 | Shin | G06V 10/82 |

OTHER PUBLICATIONS

Yuan, Zihao, Fangfang Xie, and Tingwei Ji. "Patrol agent: An autonomous uav framework for urban patrol using on board vision language model and on cloud large language model." In 2024 6th International Conference on Robotics and Computer Vision (ICRCV), pp. 237-242. IEEE, 2024. (Year: 2024).*

Ding H, Du Y, Xia Z. Urban Road Anomaly Monitoring Using Vision-Language Models for Enhanced Safety Management. Applied Sciences. Feb. 26, 2025;15(5):2517. (Year: 2025).*

(Continued)

*Primary Examiner* — David Perlman
(74) *Attorney, Agent, or Firm* — Straylight LLP

(57) ABSTRACT

System apparatus, article of manufacture, method and/or computer program embodiments are provided for detecting and monitoring compliance matters. An example method may include obtaining a first set of image data corresponding to an environment from one or more image sensors; processing the first set of image data using a first machine learning algorithm to yield annotated image data that identifies at least one object within the environment; processing the annotated image data using a second machine learning algorithm to determine one or more attributes associated with the at least one object within the environment; and generating, based on the one or more attributes, an evidence package corresponding to the at least one object within the environment, the evidence package being configured to facilitate a determination of one or more action items associated with the at least one object.

17 Claims, 13 Drawing Sheets

600

Obtain, from one or more image sensors, a first set of image data corresponding to an environment
602

Process the first set of image data using a first machine learning algorithm to yield annotated image data that identifies at least on object within the environment
604

Process the annotated image data using a second machine learning algorithm to determine one or more atributes associated with the at least one object within the environment
606

Generate, based on the one or more attributes, an evidence package corresponding to the at least one object within the environment, wherein the evidence package includes one or more action items associated with the at least one object.
608

(56) References Cited

OTHER PUBLICATIONS

Ahmed, Afaq, Muhammad Farhan, Hassan Eesaar, Kil To Chong, and Hilal Tayara. "From detection to action: A multimodal AI framework for traffic incident response." Drones 8, No. 12 (2024): 741. (Year: 2024).*

* cited by examiner

206

208

210 — Bus Stop #317

212 — Dirt:0, Damage:1

214 — Street 12.

216 — Street Sweeper:-

218 — Last capture 03/06/2025 04:44 PM

220

222

224 — Bus Stop #367

226 — Dirt:1, Damage:0

228 — Street 7

230 — Street Sweeper:-

232 — Last capture 04/06/2025 09:37 AM

268 — Dirt:0, Damage:1

266 — Bus Surface #335

270 — Street 12

272 — Street Sweeper-

274 — Last capture 03/06/2025 04:51 PM

262

264

282 — Dirt:1, Damage:1

280 — Waste Bin #353

284 — Street 12

286 — Street Sweeper-

288 — Last capture 04/06/2025 04:58 AM

276

278

Compliance Monitoring Environment 400

600

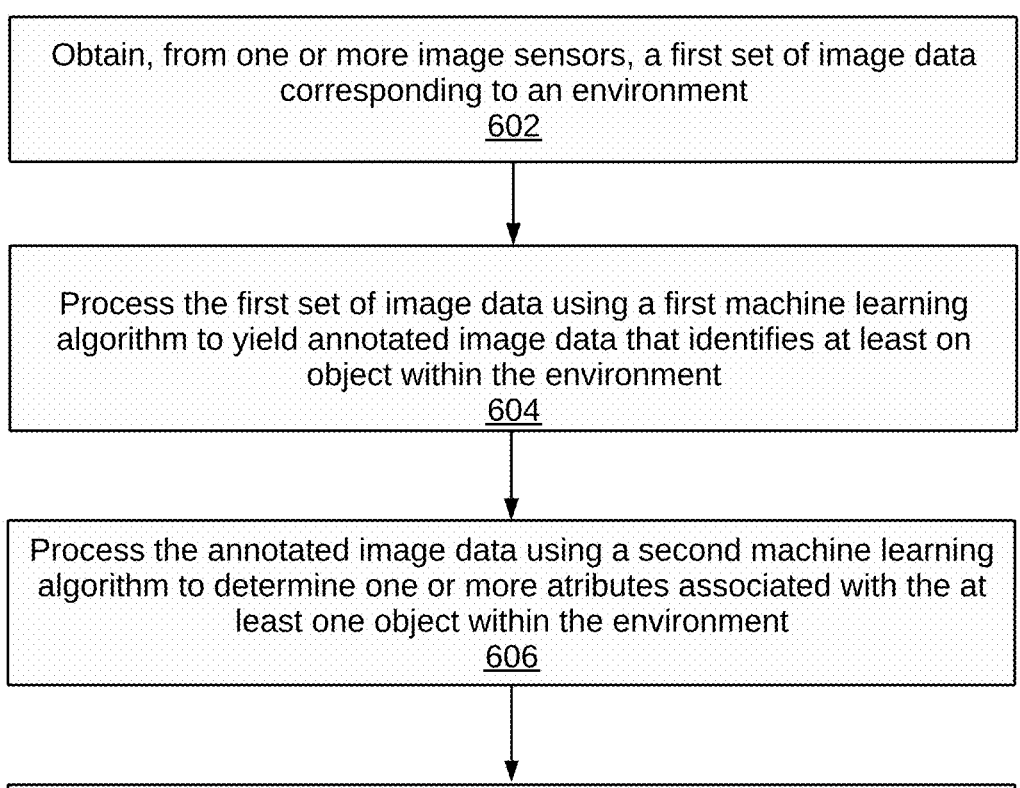

Obtain, from one or more image sensors, a first set of image data
corresponding to an environment
602

Process the first set of image data using a first machine learning
algorithm to yield annotated image data that identifies at least on
object within the environment
604

Process the annotated image data using a second machine learning
algorithm to determine one or more atributes associated with the at
least one object within the environment
606

Generate, based on the one or more attributes, an evidence package
corresponding to the at least one object within the environment,
wherein the evidence package includes one or more action items
associated with the at least one object.
608

FIG. 6

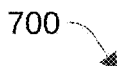
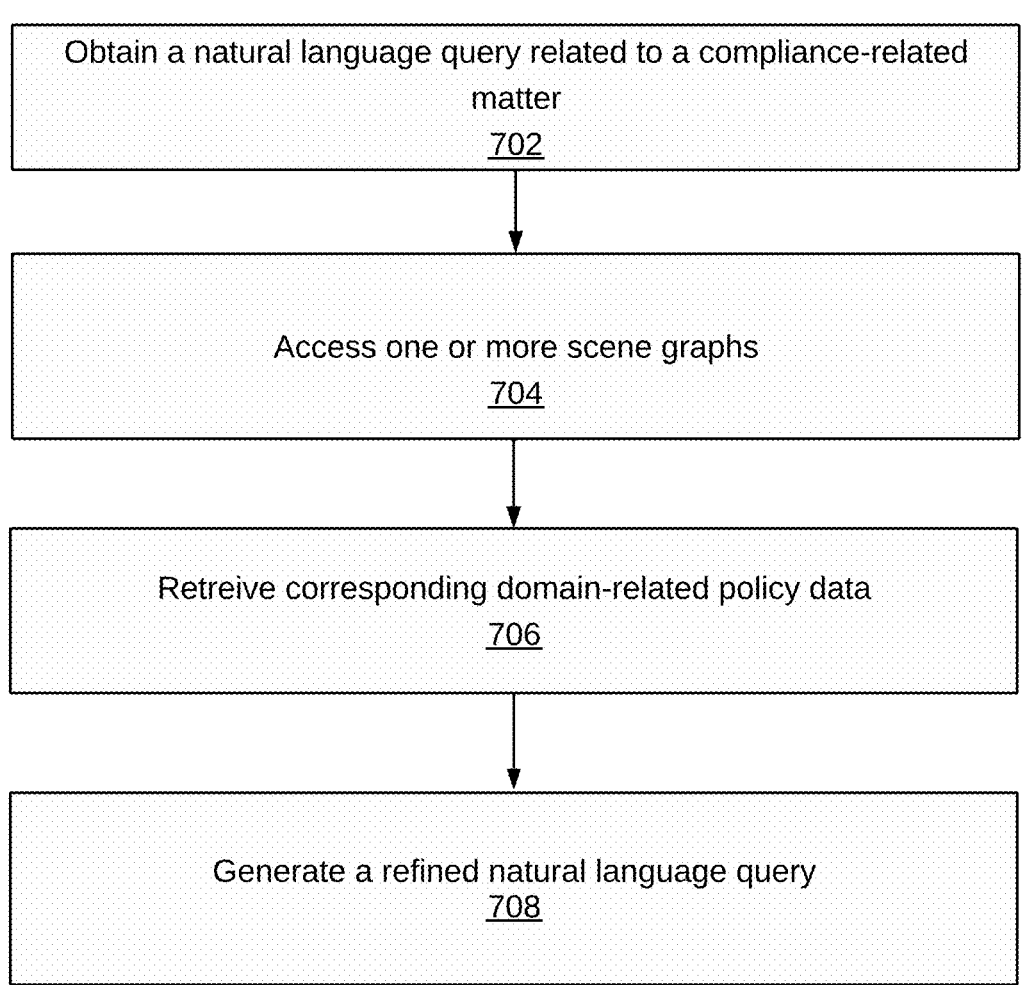
700
Obtain a natural language query related to a compliance-related matter
702
Access one or more scene graphs
704
Retreive corresponding domain-related policy data
706
Generate a refined natural language query
708
FIG. 7

MACHINE LEARNING FRAMEWORK TO DETECT AND MONITOR COMPLIANCE MATTERS

CROSS-REFERENCE TO RELATED APPLICATIONS

This application claims the benefit of priority to U.S. Provisional Application No. 63/770,777 filed on Mar. 12, 2025, the contents of which are hereby incorporated by reference in their entirety and for all purposes.

BACKGROUND

Field

This disclosure is generally related to detecting and monitoring compliance matters, and more specifically, to detecting and monitoring compliance-related matters using a machine learning framework.

BRIEF DESCRIPTION OF THE FIGURES

The accompanying drawings are incorporated herein and form a part of the specification.

FIG. 6 illustrates a flow chart of an example process for detecting and/or monitoring compliance matters, according to some examples of the present disclosure;

FIG. 7 illustrates a flow chart of an example process for refining a natural language query using scene graphs and domain-related policy data, according to some examples of the present disclosure;

DETAILED DESCRIPTION

Figure 1:
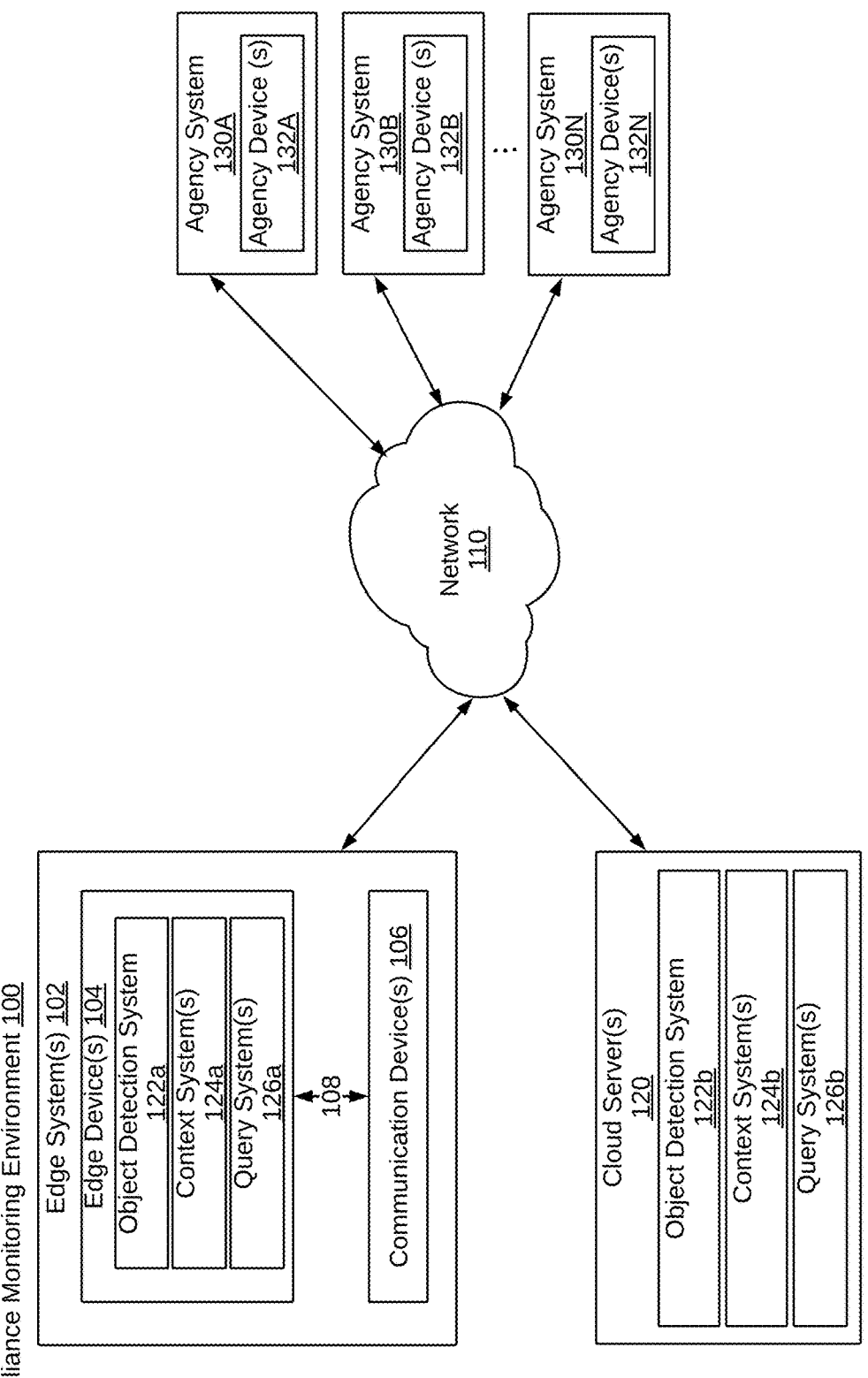
FIG. 1 illustrates a block diagram of a compliance monitoring environment, according to some examples of the present disclosure.

Ensuring compliance with regulatory, safety, and service standards is critical for maintaining public infrastructure, enforcing municipal regulations, and managing service-level agreements (SLAs). Traditional compliance monitoring approaches rely heavily on manual inspections, citizen reports, and periodic audits, which are inefficient, timeconsuming, and prone to human error. The inability to conduct real-time and continuous monitoring results in delayed responses to compliance violations, leading to safety hazards, service disruptions, regulatory non-compliance, and increased operational costs.

For example, regulatory bodies tasked with maintaining public safety and infrastructure face challenges in identifying and addressing issues such as obstructed traffic signs, road hazards, waste accumulation, and non-compliant construction activities. Similarly, municipalities and service providers must ensure that third-party contractors adhere to SLAs, such as timely waste collection and maintenance of public amenities. Existing monitoring methods often lack the scalability and automation necessary to provide a comprehensive, real-time compliance assessment.

Moreover, existing monitoring methods lack support for natural language prompts or queries, such as natural language queries provided by user's (e.g., administrators of third-party contractors, municipalities, and/or service providers). In some examples, the natural language queries may be related to or associated with compliance related matters monitored by the existing monitoring methods. For example, the existing monitoring methods may monitor one or more bus stops within a particular geographical area. An administrator of a service provider associated with the geographical area may provide a natural language query such as "Which bus stops have graffiti or structural damage this week?" In some cases, the existing monitoring methods typically rely on rigid dashboards, fixed filters, and/or manually predefined rules, offering little flexibility for real-time investigation or exploratory analysis of compliance related matters monitored by the existing monitoring methods.

Further, while the use of one or more artificial intelligence (AI) or machine learning (ML) model(s), such as a vision language model (VLM), may enable users to provide natural language queries to retrieve or analyze information related to visual data, the AI/ML model(s) may not be inherently designed or configured to operate effectively in specialized, domain-specific settings, such as, but not limited to, municipal infrastructure (e.g., roads, signage, waste bins, bus stops, etc.), public safety and regulatory enforcement (e.g., identifying hazards, violations, etc.), service-level agreement (SLA) tracking (e.g., ensuring timely maintenance, cleanliness, or repairs), and/or community compliance (e.g., neighborhood-specific visual standards, graffiti removal). Without adaptation, the AI/ML model(s) may interpret natural language queries of users in a generic or ambiguous manner, resulting in outputs that lack the precision, contextual awareness, or policy alignment needed for real-world decision-making.

This challenge is particularly evident in the domain of compliance-related matters, such as, but not limited to, involving regulatory, safety, and service standards that govern public infrastructure, municipal services, and third-party contractor obligations. In these contexts, accurate interpretation of visual scenes captured in one or more images (e.g., sanitation violations, road signage damage, improper waste disposal) requires not only an understanding of visual content but also the ability to apply local regulations, SLA thresholds, and historical context. A general-purpose AI/ML model, such as a general purpose VLM, trained on open-domain image-text data, may not recognize nuanced compliance conditions, misinterpret domain-specific terminology, or fail to reflect jurisdictional policies embedded in the query intent.

Provided herein are system, apparatus, device, method (also referred to as a process) and/or computer program product embodiments, combinations and/or sub-combinations thereof (also referred to as "systems and techniques" hereinafter) for implementing a machine learning framework to detect and monitor compliance matters. In some aspects, the present technology provides an automated compliance monitoring framework that integrates computer vision and machine learning to detect, analyze, and track compliance-related matters in various environments. In some aspects, the framework can utilize edge devices equipped with image sensors to capture visual data, which can be processed using advanced machine learning models to identify objects, structures, and environmental conditions associated with compliance matters. Further processing can determine contextual attributes such as damage severity, cleanliness levels, and regulatory adherence.

In some aspects, the present technology can leverage artificial intelligence (AI) and cloud-based computing resources to enable continuous and scalable compliance monitoring, which reduces reliance on manual inspections and improves the accuracy and efficiency of compliance assessments. In some cases, the present technology can facilitate real-time reporting and integration with agency systems for enforcement actions, maintenance scheduling, and compliance tracking.

In some configurations, edge devices can be deployed in multiple environments to capture image data that can be used for compliance monitoring. For instance, edge devices can be mounted on stationary structures or mobile platforms such as vehicles, drones, robots, and public transportation units, providing comprehensive compliance coverage. By employing a distributed processing approach, the system balances computational workload between edge devices and cloud servers to optimize efficiency and ensure real-time analysis of compliance-related data.

In some examples, the present technology can include object detection and context analysis components that can be used to identify regulatory elements (e.g., traffic signs, safety barriers, sanitation levels, and construction compliance issues.) In some configurations, the context analysis system can refine the detected information, assessing compliance status based on predefined regulations and service-level requirements. For example, the system can determine whether a stop sign is defaced, obstructed, or missing and can subsequently generate an evidence package detailing the violation, its severity, and, in some instances, the necessary corrective actions.

Additionally, in some instances, the present technology can facilitate collaboration between multiple agencies by enabling data exchange and coordination. Compliance-related data can be shared across agency systems as well as service providers, allowing various entities to efficiently address compliance violations in their respective domains. The integration of machine learning models can further enhance the system's adaptability by continuously improving detection accuracy through real-time learning and model updates.

In some cases, the disclosed technology provides systems and techniques for enabling natural language interaction, such as natural language queries, with the automated compliance monitoring framework through the use of AI/ML models, such as a vision-language model (VLM).

In some configurations, the AI/ML model(s) may process natural language queries provided by users (e.g., administrators of third-party contractors, municipalities, and/or service providers) to retrieve or analyze compliance-related matters monitored by the automated compliance monitoring framework. For example, in a monitoring scenario involving a network of bus stops, a user may submit a query such as, "Which bus stops have graffiti or structural damage this week?" The automated compliance monitoring framework may use a VLM to process the query, interpret the intent, and evaluate relevant visual data (e.g., recent images of the monitored bus stops) to identify matching conditions.

In some aspects, the disclosed technology allows users to provide one or more natural language queries across multiple compliance categories, including safety hazards, regulatory violations, and service-level deviations, using free-form, task-oriented language. The automated compliance monitoring framework may process the one or more natural language queries using the AI/ML model(s), such as a VLM. The AI/ML model(s) may enable more intuitive review, investigation, and assessment of compliance-related matters. Moreover, the AI/ML model(s) may overcome the limitations of traditional compliance monitoring systems that rely on rigid dashboards, predefined filters, and manually scripted rule logic, thereby improving user accessibility, system responsiveness, and real-time decision-making across diverse operational environments.

In some instances, the disclosed technology provides systems and techniques for adapting or configuring AI/ML model(s) that process natural language queries/prompts, such as a vision-language model, for one or more domains, including, but not limited to, compliance-related environments involving municipal infrastructure, public safety enforcement, service-level agreement (SLA) tracking, and community standards enforcement. The disclosed technology described herein may enhance the ability of the AI/ML model(s) to interpret natural language queries in a manner that is contextually aligned with domain-specific policies, operational expectations, and/or visual semantics. Although the present disclosure describes examples related to the adaptation or configuration of AI/ML model(s) for compliance-related domains, it should be understood that the disclosed systems and techniques may be applicable to any domain in which natural language understanding, visual reasoning, and context-aware decision-making are beneficial."

In some examples, the disclosed technology described herein may adapt or configure AI/ML model(s) that process natural language queries/prompts for the domain(s) by implementing one or more domain-specific fine tuning operations or techniques (e.g., using training datasets that include labeled visual content and associated compliance-related outcomes specific to the target domain). For example, training data may include annotated images depicting overflowing waste bins, obstructed traffic signs, damaged street furniture, or other municipal infrastructure conditions. Moreover, fine-tuning the AI/ML model(s) using training data associated with the compliance-related domain may improve the AI/ML model(s)' sensitivity to compliance-related visual cues and semantic distinctions.

In some cases, the disclosed technology described herein may adapt or configure AI/ML model(s) that process natural language queries/prompts for the domain(s) by using domain relevant data to process (e.g., interpret) the natural language queries. In some configurations, the disclosed technology described herein may access one or more contextual knowledge databases to obtain and/or use the domain relevant data. Examples of the domain relevant data includes, but is not limited to, structured data (e.g., asset metadata, GIS layers, SLA performance logs), unstructured data (e.g., municipal codes, contractor policies), scene graphs describing relationships between detected objects (e.g., "trash overflowing from bin next to bench"), and/or embeddings indices containing prior prompt/response pairs or model outputs. As described herein, the disclosed technology described herein may use the domain relevant data to refine or reformulate natural language queries provided by users. The refined or reformulated natural language queries may be more aligned with a domain, such as, but not limited to, domain-specific conditions, regulatory policies, and/or compliance thresholds. For instance, a user-submitted query/prompt such as "Should this bin be flagged for pickup?" may be reformulated to include contextual language such as "bins exceeding 85% capacity and exhibiting visible overflow must be serviced within 24 hours."

In some aspects, the disclosed technology described herein may adapt or configure AI/ML model(s) that process natural language prompts/queries for the domain(s) by implementing one or more self-supervised learning processes. The self-supervised learning processes may enable the AI/ML model(s) to improve performance over time without relying on manually labeled training data. For example, the self-supervised learning processes may include analyzing temporal patterns, operational cycles, or environmental context derived from domain-specific observations to model expected asset behavior and identify anomalies. The context of a compliance-related domain, such as municipal infrastructure or public service monitoring, the self-supervised learning processes may include analyzing time-series imagery (e.g., sequential images of the same asset captured over time) to learn how compliance-relevant features evolve under normal conditions. For instance, the disclosed technology may learn that waste bins typically fill gradually between scheduled pickups.

Based on this learned expectation, the disclosed technology may detect deviations such as unexpectedly rapid fill rates or overflow conditions, enabling effective compliance assessments even in the absence of explicit violation labels.

In some instances, the disclosed technology described herein may adapt or configure AI/ML model(s) that process natural language prompts/queries for the domain(s) by implementing one or more machine policy understanding (MPU) processes or operations. As described herein, MPU operation(s) may enable the AI/ML model(s) to interpret, reason over, and apply policy-related information, such as domain-specific rules, conditions, thresholds, or decision logic, during inference. Moreover, the MPU operation(s) may include accessing one or more knowledge sources, such as contextual knowledge database(s), to extract and structure relevant policy clauses, regulatory thresholds, and/or condition-action relationships. These extracted elements may be converted into structured templates or logic-based representations that can be referenced by the AI/ML model(s) during inference and/or prompt resolution to improve domain alignment, traceability, and explainability.

For instance, in a compliance-related domain such as municipal infrastructure or public accessibility enforcement, the MPU operations may involve parsing natural language policy documents (e.g., municipal codes, service contracts, or accessibility guidelines) to extract clauses such as "sidewalks must maintain a minimum clearance of 36 inches for ADA compliance." Based on this extracted policy clause, the AI/ML model(s) may evaluate a natural language query related to sidewalk obstruction by measuring the passable width of the sidewalk from an input image. The AI/ML model(s) may use the structured policy rule to generate a compliance-aware response such as, "Clearance is reduced to 28 inches; sidewalk does not meet ADA minimum requirement."

Various embodiments and aspects of this disclosure may be implemented using, and/or may be part of, compliance monitoring environment 100 shown in FIG. 1. It is noted, however, that the compliance monitoring environment 100 is provided for illustrative purposes and is not limiting. Examples and embodiments of this disclosure may be implemented using, and/or may be part of, environments that are different from and/or in addition to the compliance monitoring environment 100, as will be appreciated by persons skilled in the relevant art(s) based on the teachings contained herein. An example of the compliance monitoring environment 100 shall now be described.

Example Compliance Monitoring Environment

FIG. 1 illustrates a block diagram of a compliance monitoring environment 100, according to some aspects of the present technology. In some examples, compliance monitoring environment 100 can be implemented to detect and/or monitor compliance-related matters associated with government agencies, contractors, service providers, property owners, etc. Examples of compliance matters include, but are not limited to, safety compliance matters, regulatory compliance matters, service compliance matters, traffic compliance matters, permit compliance matters, community compliance matters, etc.

In some aspects, compliance monitoring environment 100 may include edge system(s) 102. In some cases, edge system(s) 102 can include one or more edge device(s) 104 that may be equipped with one or more sensors such as camera sensors (e.g., still image cameras, video cameras, etc.), light sensors (e.g., light detection and ranging (LiDAR) systems, ambient light sensors, infrared sensors, etc.), RADAR systems, GPS receivers, audio sensors, etc. In some instances, edge system(s) 102 can be configured to capture, process, and/or analyze sensor data corresponding to an environment to detect and/or monitor compliance matters.

In some cases, edge device(s) 104 may be deployed in environments that can include public roads, sidewalks, parks, residential communities, commercial districts, transit stations, government buildings, waste management facilities, intersections, bridges, tunnels, public utility infrastructure, and/or any other environment suitable for compliance detection and/or monitoring. In some instances, edge device(s) 104 may be mounted on vehicles such as cars, trucks, autonomous vehicles, bicycles, scooters, waste management vehicles, public safety vehicles, drones, robots, boats, cruise ships, submersible vehicles, and/or any other type of land, water, and/or aerial vehicle. In further examples, edge device(s) 104 may be stationary (e.g., fixed) at a particular location such as, for example, an intersection or a park.

As noted above, compliance matters can be related to safety compliance matters, regulatory compliance matters, service compliance matters, traffic compliance matters, permit compliance matters, community compliance matters, etc. Examples of safety compliance matters detected/monitored within compliance monitoring environment 100 can include, but are not limited to, road hazards, waste accumulation, debris management, etc. In one illustrative example, a safety compliance matter may include a downed power line or a tire in the middle of a roadway.

In some examples, regulatory compliance matters detected/monitored within compliance monitoring environment 100 can include, but is not limited to, infrastructure-related requirements associated with the maintenance, upkeep, and functional integrity of public or private assets, transportation systems, and general municipal infrastructure. Illustrative examples of regulatory compliance include road infrastructure maintenance, public transportation related requirements, public utility related requirements, waste management and sanitation requirements, etc.

In some instances, service compliance matters detected/monitored within compliance monitoring environment 100 can include contractor or third-party performance monitoring to ensure adherence with Service Level Agreements (SLAs). In one illustrative example, a service compliance matter may include monitoring performance of a contractor that performs waste collection on behalf of a municipality. In another example, a service compliance matter may include monitoring performance of a third-party that provides landscaping services.

In some aspects, traffic compliance matters detected/monitored within compliance monitoring environment 100 can include detection of traffic violations and identification of infringing parties. In one illustrative example, a traffic compliance matter can include detection and identification of an unauthorized vehicle within a bus lane or within a high-occupancy vehicle (HOV) lane.

In some cases, permit compliance matters detected/monitored within monitoring environment 100 can include adherence to building codes and/or other permit-related activities that are subject to regulation. For example, residential and/or commercial building improvements (e.g., roof repair/replacement, fence installation, etc.) may be subject to permitting requirements. In another example, certain types or sizes of vehicles may be subject to permitting requirements.

In some instances, community compliance matters detected/monitored within monitoring environment 100 can include adherence to community-specific rules and regulations. For example, a residential community may be subject to rules imposed by a homeowner's association that relate to the appearance of property. In one illustrative example, a community compliance violation may include a dirty roof that requires pressure washing or a damaged mailbox that needs to be repaired/replaced.

In some examples, edge device(s) 104 may be configured to obtain image data (e.g., still pictures and/or one or more video frames) of an environment, and edge device(s) 104 can use the image data to detect and/or monitor one or more compliance matters. For instance, edge device(s) 104 may use image data to identify a compliance violation and/or to confirm that an action item associated with a compliance issue has been taken (e.g., the compliance matter has been resolved). In some cases, edge device(s) 104 may annotate the obtained image data to visually indicate detected objects, structures, environmental conditions, or other relevant features (e.g., bounding boxes, outlines, labels, or highlights) associated with a compliance matter.

In some cases, edge device(s) 104 can include an object detection system 122a that is configured to implement one or more algorithms that can process image data to detect and identify one or more objects, structures, environmental conditions, and/or any other visual indicators within an environment that may be associated with a compliance matter. Examples of objects that can be detected by object detection system 122a include, but are not limited to, environmental elements (e.g., land cover element(s), topography elements(s), environmental conditions and objects, such as, but not limited to, trees, vegetation, landscaping, and the like, etc.), large-scale infrastructure elements (e.g., roads, buildings, bridges, billboards, bus shelters, sidewalk, sidewalk curbs, a-frames, dining sheds, etc.), small-scale infrastructure elements (e.g., traffic-related elements such as traffic signs, traffic signals, traffic cameras, road markers, line markings, parking meters, bicycle lane markers, bicycle racks, public transit signs, road surface wear, etc.), vehicles (e.g., emergency vehicles, construction vehicles, passenger vehicles, public transit vehicles, etc.), utility-related elements (e.g., utility poles, streetlamps, post boxes, phone booths, sewer intakes, fire hydrants, etc.), emergency-related elements (e.g., emergency signals, fire hydrants, etc.), waste-related elements (e.g., receptacles, such as, but not limited to, trashcans/wastebin/waste container/garbage container, etc.), waste identification (e.g., bulk waste, green waste, tire waste, construction waste, etc.), animal by-products (e.g., dead animal carcass, etc.), street furniture (e.g., benches, sculptures, fountains, etc.), debris type elements (e.g., road—surface debris, etc.), barrier-related elements (e.g., bollard, etc.), non-fixed form elements (e.g., graffiti), context sensitive elements (e.g., tire waste, visual pollution, waste around garbage/waste bins, illegal dumping, potholes, etc.), obstruction type conditions (e.g., signage obstructions, roadway or accessway obstructions), cleanliness type conditions (e.g., signage cleanliness, etc.), and/or dynamic composition elements (e.g., sand accumulation, drainage waste stemming from drainage issues).

In some examples, edge device(s) 104 can include a context system 124a that is configured to implement one or more algorithms that can process image data to determine context information (e.g., attributes, properties, characteristics, etc.) related to the object/environment that may be associated with a compliance matter. As described herein, context information may include, but is not limited to, the type of compliance matter, characteristics of an object or environment (e.g., conditions related to damage, cleanliness, etc.), severity level (e.g., substantial damage vs. minimal damage), timestamps, etc.

In some aspects, edge device(s) 104 can generate (e.g., using object detection system 122a and/or context system 124a) an evidence package that includes information related to a compliance matter. For instance, an evidence package may indicate the presence of a compliance violation, and/or portions of image data that are associated with object(s), structure(s), environmental condition(s), visual indicator(s) associated with a compliance matter, and/or contextual information (e.g., attributes) associated with a compliance matter. In some cases, the evidence package generated by edge device(s) 104 may include the annotated image data described above, allowing reviewers to visually confirm the detected object(s), structure(s), or environmental condition(s) and their associated locations or boundaries. In some examples, edge device(s) 104 can generate the evidence package using AI/ML models configured to generate coherent and contextually relevant language-based content. In one illustrative example, a vision language model (VLM) can be used to generate the evidence package.

In one illustrative example, edge device(s) 104 can use image data to identify a compliance issue corresponding to a street sign that is obstructed by vegetation. In some cases, edge device(s) 104 can generate an evidence package that can include data related to the compliance matter such as, for example, image data of the obstructed street sign, severity level, compliance requirements (e.g., timetable for correcting matter), an annotated image visually highlighting the obstructing vegetation and its relation to the sign, etc.

Figure 2B:
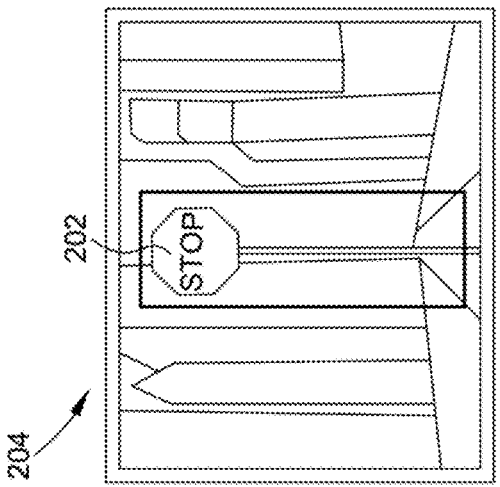
FIG. 2A and FIG. 2B illustrate examples of images that can be used to detect and monitor compliance matters, according to some examples of the present disclosure.
Figure 2A:
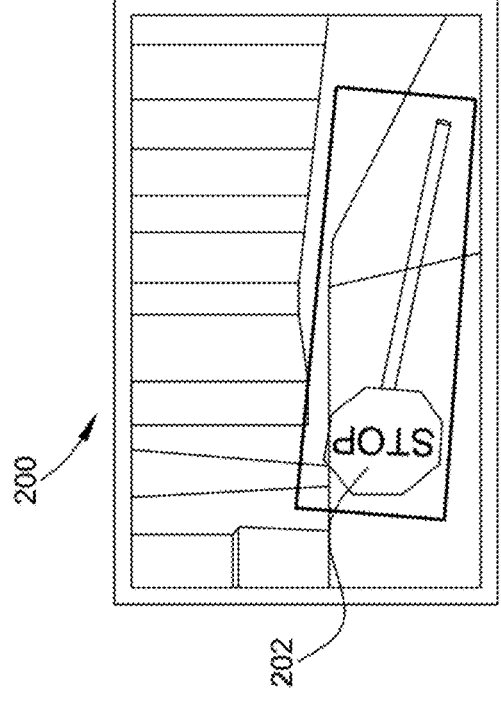

FIG. 2A illustrates an example of an image 200 in which stop sign 202 has been detected by edge device(s) 104. In some aspects, edge device(s) 104 may process image 200 to determine that stop sign 202 requires repair because it has collapsed. In some cases, edge device(s) 104 may generate an evidence package indicating the location of the stop sign 202 and a high severity level because stop sign 202 is partially block the roadway. In some cases, the evidence package can be transmitted to a service provider that is responsible for repairing stop sign 202.

FIG. 2B illustrates an example of an image 204 in which stop sign 202 has been detected by edge device(s) 104. In some examples, edge device(s) 104 can process image 204 to determine that stop sign 202 has been repaired. In some cases, edge device(s) 104 can generate an evidence package indicating that the compliance issue has been resolved.

Figure 3:
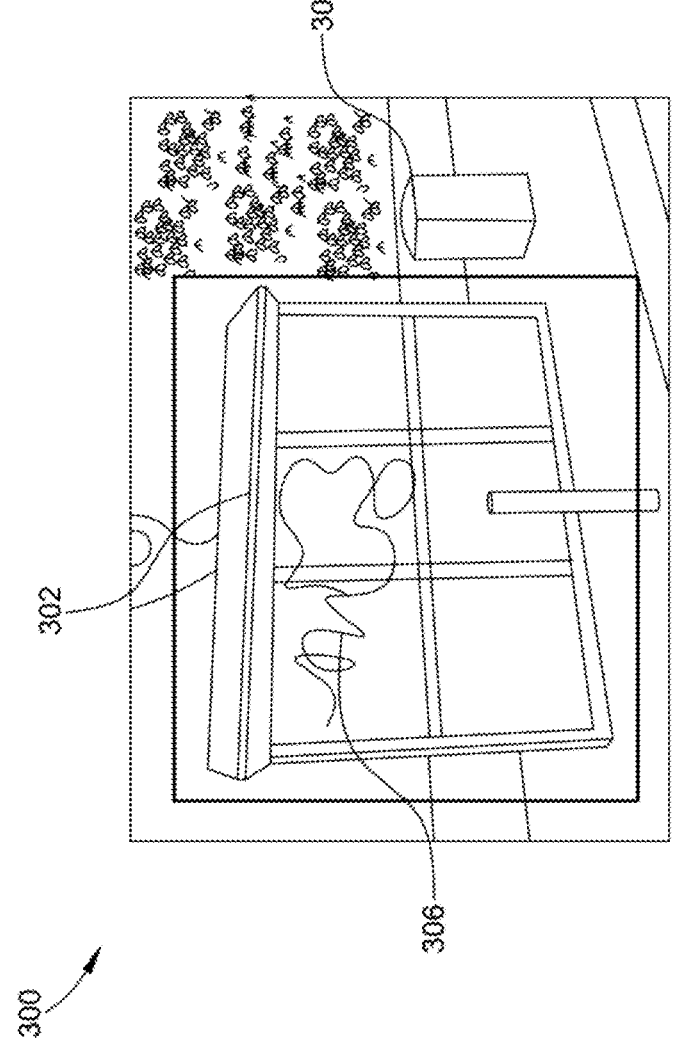
FIG. 3 illustrates another example of an image that can be used to detect and monitor compliance matters, according to some examples of the present disclosure.

FIG. 3 illustrates an example of an image 300 that includes a bus stop shelter 302 and a trash can 304. In some cases, edge device(s) 104 can process image 300 to generate an evidence package that may include a damage assessment, a cleanliness assessment, and a maintenance requirement. For instance, edge device(s) 104 may generate an evidence package that indicates a low level of damage (e.g., no structural damage to bus stop shelter 302); a low level of cleanliness (e.g., trash can 304 is old and rusted); a low maintenance requirement (e.g., general wear and tear but immediate attention not required); and a low level of aesthetics (e.g., graffiti 306 is present on the glass of the bus stop shelter 302).

Returning to FIG. 1, in some examples, compliance monitoring environment 100 can include network 110. In some instances, network 110 can include one or more public and/or private networks. In some examples, the network 110 can include, without limitation, the Internet; a wide area network (WAN); a backbone network; a cloud network; a local area network (LAN); a datacenter network; a network segment; an Internet Service Provider (ISP) network; a wireless LAN; an intranet; an extranet; a wired and/or wireless network such as a cellular network, a Bluetooth network or link, an infrared network or link, a WIFI network, etc.; and/or any other short range, long range, local, regional, global communications mechanism, means, approach, protocol and/or network, or any combination(s) thereof.

In some aspects, edge device(s) 104 may be configured to communicate with network 110 via communication device(s) 106. The communication device(s) 106 may include, for example, a cable modem, a satellite television (TV) transceiver, a router, an access point, a network interface card, an antenna, etc. The media device(s) 104 may communicate with the communication device(s) 106 over a link 108. The link 108 may include a wireless connection(s) (e.g., WIFI, etc.) and/or wired connection(s).

In some configurations, natural language queries processed by query system(s) 126a and/or 126b may be directly associated with, or refer to, image or video frames captured by edge device(s) 104. For example, an inspector operating an agency device may submit a query such as, "Does the image of this waste bin show overflow beyond the 85% threshold?" In such example, query system 126a may process the user-submitted query in conjunction with the specific image data or video frames captured by the corresponding edge device(s) 104. Additionally, or alternatively, natural language queries may also incorporate or rely upon additional information beyond visual data, including jurisdiction-specific policy documents (e.g., municipal codes, SLAs), historic compliance data (e.g., prior violation records, maintenance schedules), and/or meta- or context-related information (e.g., timestamp, geographic location, temperature, humidity, or other sensor readings). For example, a user may submit a natural language query "based on the photo taken at 8:00 AM, and given the SLA requiring collection within 72 hours, is this bin overdue for pickup?" In such example, query system(s) 126a and/or 126b may retrieve and combine the referenced image or video data with structured and unstructured contextual information to generate a compliance-aware response aligned with operational and regulatory expectations.

In some configurations, compliance monitoring environment 100 can include one or more agency systems (e.g., agency systems 130A, 130B, and 130N; collectively referred to as "agency system(s) 130"). In some aspects, agency system(s) 130 can each include one or more agency devices 132. Agency system(s) 130 may host, implement, and/or represent an agency (e.g., government agency), department, association, regulatory body, etc. that may be responsible for enforcing, managing, servicing, and/or maintaining compliance matters. For example, agency device(s) 132 of agency system(s) 130 may manage, process, track, and enforce compliance-related activities (e.g., based on related internal or external regulations), such as monitoring the condition of public infrastructure, ensuring adherence to safety regulations, overseeing service level agreements (SLAs) between contractors and governing entities, managing compliance-related enforcement actions, and/or addressing compliance related issues.

In some examples, agency system(s) 130 may obtain an evidence package, along with any associated contextual information, from one or more edge devices 104 and/or one or more cloud servers 120. As described herein, the evidence package may indicate the presence of a compliance violation, and/or portions of image data that are associated with object(s), structure(s), environmental condition(s), visual indicator(s) associated with the compliance violation, and/or contextual information (e.g., attributes) associated with the compliance violation (e.g., the type of violation associated with the determined compliance violation, characteristic(s) of the determined compliance violation such as level of damage, level of cleanliness, level of maintenance, level of graffiti, location of the violation, the time the violation was detected, etc., and the overall severity of the determined compliance violation). In some instances, the evidence package may include annotated image data highlighting the detected object(s), structure(s), environmental condition(s), or other visual indicators associated with the compliance violation.

Moreover, agency system(s) 130 may process one or more portions of the evidence package using one or more AI/ML models trained for compliance-related assessment and decision-making. In some aspects, the AI/ML model(s) may process one or more portions of the image data, annotated image data, and/or contextual information together to verify the existence of the compliance violation, classify the compliance violation into one or more predefined categories (e.g., waste overflow, structural hazard, signage obstruction), assess the severity or impact of the compliance violation, and determine one or more corrective actions or action items to address the compliance violation. For example, the AI/ML model(s) may compare the measured condition against applicable compliance thresholds stored in agency system(s) 130 (e.g., compliance-related data) to determine severity (e.g., whether the level of overflow exceeds the threshold for "critical" response) and may cross-reference SLA timelines or regulatory requirements to determine an appropriate corrective action (e.g., immediate dispatch of a service crew, scheduling of maintenance during the next service window, or issuing a violation notice).

As described herein, the determination of corrective actions may further include assessing urgency or prioritization level. For example, the AI/ML model(s) may evaluate factors such as the violation's proximity to sensitive areas (e.g., schools, hospitals), its impact on public safety or regulatory compliance, applicable SLA deadlines, and whether the violation represents a recurring or escalating condition. Based on such evaluation, agency system(s) 130 may classify a violation as requiring immediate remediation (e.g., same-day waste pickup for a public park bin exceeding an overflow threshold) or as eligible for deferred action (e.g., graffiti removal in a low-traffic area scheduled during routine maintenance).

In some examples, agency device(s) 132 may present a user interface (UI), such as a graphical UI (GUI), displaying information included in an evidence package associated with a detected compliance matter, such as a compliance violation. As described herein, the evidence package may include data, such as, but not limited to, one or more related compliance asset(s) (e.g., a waste bin), corresponding image and/or video data, and associated metadata (e.g., timestamp, identified compliance-related asset(s), object identifiers of the identified compliance-related asset(s), location such as geographical coordinates, camera angle, etc.). Additionally, or alternatively, the evidence package may include contextual information, such as, but not limited to, attributes, properties, and characteristics of the compliance matter (e.g., type of violation, level of damage, cleanliness, maintenance deficiencies, presence of graffiti, location, time detected, and severity level). In some cases, the evidence package may include data/information identifying and characterizing the edge device(s) 104 that captured the image and/or video data included in the evidence package, such as the device type, device identifier, and/or an associated vehicle (e.g., a municipal waste collection truck or inspection vehicle in which the edge device 104 is installed). Such information/data may be presented by the UI. In some instances, the UI may further present an image or video of the detected compliance matter, enabling the user to visually assess the compliance matter in conjunction with the associated metadata and contextual information.

Figures 2C, 2D:
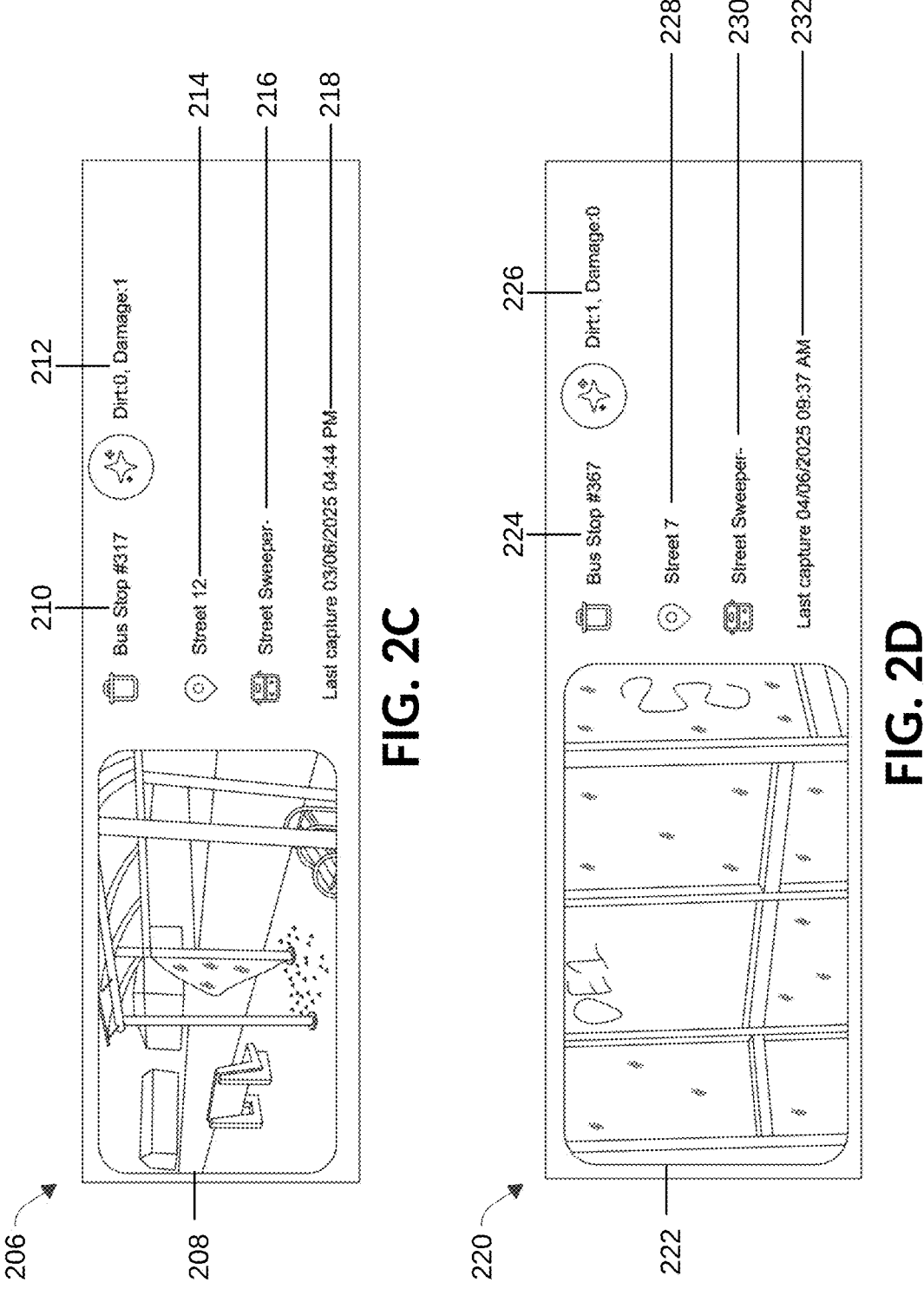
FIG. 2C-FIG. 2H illustrate examples of user interfaces for presenting information included in an evidence package, according to some examples of the present disclosure.

FIG. 2C illustrates an example user interface (UI) 206 for presenting information included in an evidence package, according to some examples of the present disclosure. As shown, UI 206 may include an image 208 of a detected compliance matter, such as a compliance violation. In the example illustrated in FIG. 2C, the compliance violation corresponds to a damaged bus stop (e.g., broken glass paneling). UI 206 may further display an object identifier 210 associated with the compliance-related asset (e.g., the bus stop), as well as contextual information 212 describing attributes of the compliance matter (e.g., severity level of the damage). In some examples, UI 206 may also present one or more items of metadata associated with image 208, such as metadata 214 indicating a location of the compliance matter (e.g., GPS coordinates) and metadata 216 indicating a timestamp corresponding to when the image 208 was captured. Additionally, UI 206 may present information identifying the edge device 104 that captured the image 208, such as edge device information 218. In the illustrated example, edge device information 218 identifies the capturing edge device 104 as being associated with a particular vehicle (e.g., "Street Sweeper").

FIG. 2D illustrates an example user interface (UI) 220 for presenting information included in an evidence package, according to some examples of the present disclosure. As shown, UI 220 may include an image 222 of a detected compliance matter, such as a compliance violation. In the example illustrated in FIG. 2D, the compliance violation corresponds to a bus stop defaced with graffiti. UI 220 may further display an object identifier 224 associated with the compliance-related asset (e.g., the bus stop), as well as contextual information 226 describing attributes of the compliance matter (e.g., severity level of the damage). In some examples, UI 220 may also present one or more items of metadata associated with image 222, such as metadata 228 indicating a location of the compliance matter (e.g., GPS coordinates) and metadata 230 indicating a timestamp corresponding to when the image 222 was captured. Additionally, UI 220 may present information identifying the edge device 104 that captured the image 222, such as edge device information 232. In the illustrated example, edge device information 232 identifies the capturing edge device 104 as being associated with a particular vehicle (e.g., "Street Sweeper").

Figures 2E, 2F:
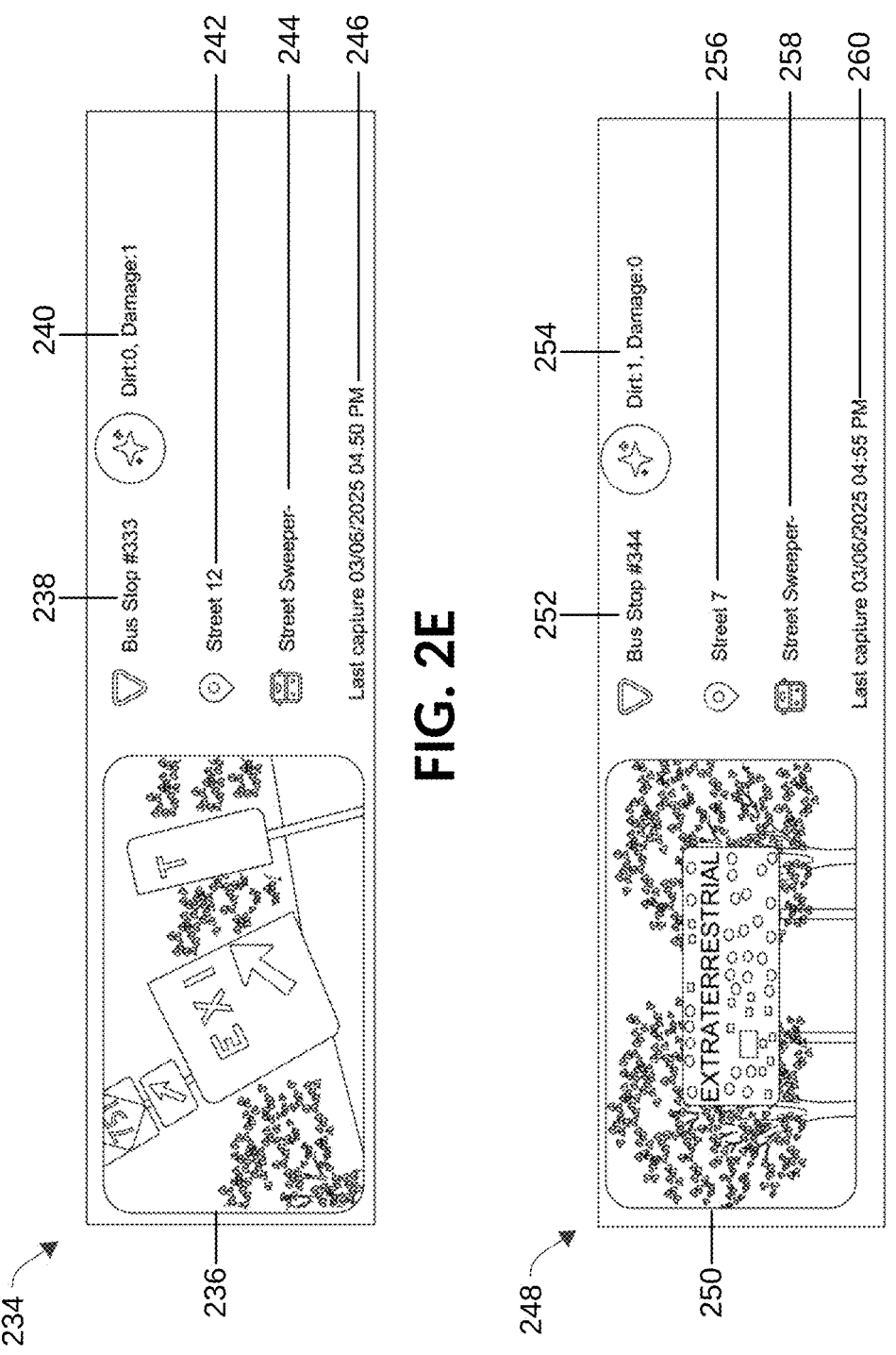

FIG. 2E illustrates an example user interface (UI) 234 for presenting information included in an evidence package, according to some examples of the present disclosure. As shown, UI 234 may include an image 236 of a detected compliance matter, such as a compliance violation. In the example illustrated in FIG. 2E, the compliance violation corresponds to a road sign that has been broken. UI 234 may further display an object identifier 238 associated with the compliance-related asset (e.g., the road sign), as well as contextual information 240 describing attributes of the compliance matter (e.g., severity level of the damage). In some examples, UI 234 may also present one or more items of metadata associated with image 236, such as metadata 242 indicating a location of the compliance matter (e.g., GPS coordinates) and metadata 246 indicating a timestamp corresponding to when the image 236 was captured. Additionally, UI 234 may present information identifying the edge device 104 that captured the image 236, such as edge device information 244. In the illustrated example, edge device information 244 identifies the capturing edge device 104 as being associated with a particular vehicle (e.g., "Street Sweeper").

FIG. 2F illustrates an example user interface (UI) 248 for presenting information included in an evidence package, according to some examples of the present disclosure. As shown, UI 248 may include an image 250 of a detected compliance matter, such as a compliance violation. In the example illustrated in FIG. 2F, the compliance violation corresponds to a road sign defaced with graffiti. UI 248 may further display an object identifier 252 associated with the compliance-related asset (e.g., the road sign), as well as contextual information 254 describing attributes of the compliance matter (e.g., severity level of the damage). In some examples, UI 248 may also present one or more items of metadata associated with image 250, such as metadata 256 indicating a location of the compliance matter (e.g., GPS coordinates) and metadata 260 indicating a timestamp corresponding to when the image 250 was captured. Additionally, UI 248 may present information identifying the edge device 104 that captured the image 250, such as edge device information 258. In the illustrated example, edge device information 258 identifies the capturing edge device 104 as being associated with a particular vehicle (e.g., "Street Sweeper").

Figures 2G, 2H:
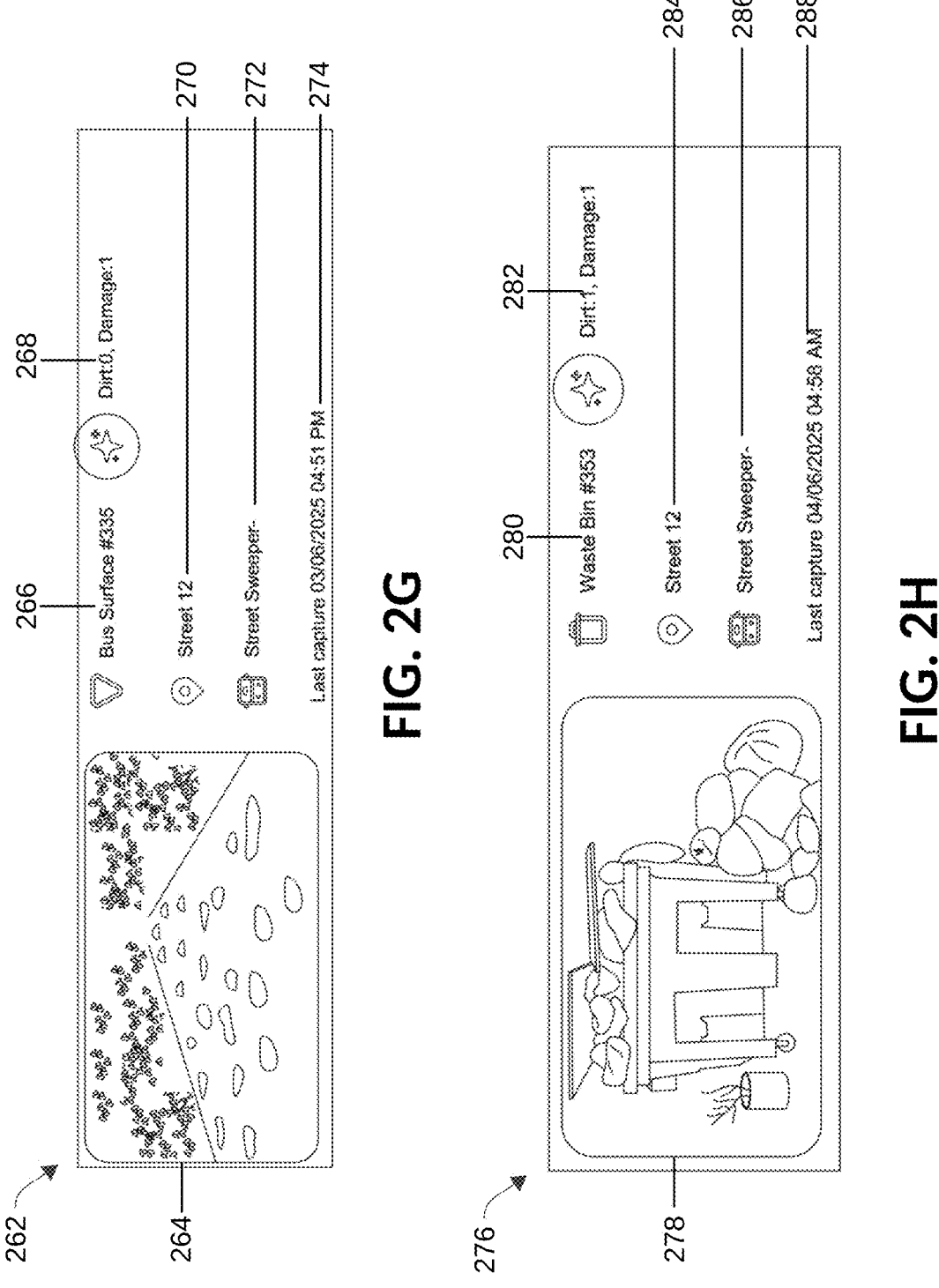

FIG. 2G illustrates an example user interface (UI) 262 for presenting information included in an evidence package, according to some examples of the present disclosure. As shown, UI 262 may include an image 264 of a detected compliance matter, such as a compliance violation. In the example illustrated in FIG. 2G, the compliance violation corresponds to a damaged road having multiple potholes. UI 262 may further display an object identifier 266 associated with the compliance-related asset (e.g., the roadway segment), as well as contextual information 268 describing attributes of the compliance matter (e.g., severity level of the damage). In some examples, UI 262 may also present one or more items of metadata associated with image 264, such as metadata 270 indicating a location of the compliance matter (e.g., GPS coordinates) and metadata 274 indicating a time-stamp corresponding to when the image 264 was captured. Additionally, UI 262 may present information identifying the edge device 104 that captured the image 264, such as edge device information 272. In the illustrated example, edge device information 272 identifies the capturing edge device 104 as being associated with a particular vehicle (e.g., "Street Sweeper").

FIG. 2H illustrates an example user interface (UI) 276 for presenting information included in an evidence package, according to some examples of the present disclosure. As shown, UI 276 may include an image 278 of a detected compliance matter, such as a compliance violation. In the example illustrated in FIG. 2H, the compliance violation corresponds to an overfilled waste bin. UI 276 may further display an object identifier 280 associated with the compliance-related asset (e.g., the specific waste bin), as well as contextual information 282 describing attributes of the compliance matter (e.g., severity level of the overflow condition). In some examples, UI 276 may also present one or more items of metadata associated with image 278, such as metadata 284 indicating a location of the compliance matter (e.g., GPS coordinates) and metadata 288 indicating a time-stamp corresponding to when the image 278 was captured. Additionally, UI 276 may present information identifying the edge device 104 that captured the image 278, such as edge device information 286. In the illustrated example, edge device information 286 identifies the capturing edge device 104 as being associated with a particular vehicle (e.g., "Street Sweeper").

In some examples, agency system(s) 130 may store and manage compliance-related data. As described herein, compliance-related data may include, but is not limited to, data identifying and characterizing detected compliance violations, contextual information of each detected compliance violation (e.g., the type of violation associated with the determined compliance violation, characteristic(s) of the determined compliance violation such as level of damage, level of cleanliness, level of maintenance, level of graffiti, location of the violation, the time the violation was detected, etc., and the overall severity of the determined compliance violation), maintenance tasks, maintenance schedules, performance metrics for each maintenance task, performance metrics for compliance violations (e.g., resolution timelines for compliance violations) and/or related internal or external governmental regulations (e.g., jurisdictional regulations, agency policies, etc.).

In some cases, agency system(s) 130 may communicate, coordinate, and exchange compliance-related data to other agency system(s) 130 to manage compliance matters across multiple agencies. For example, different agency system(s) 130 may track and manage overlapping compliance responsibilities, such as monitoring road safety hazards, waste accumulation violations, and infrastructure maintenance requirements within a given local jurisdiction.

Additionally, or alternatively, some agency system(s) 130 may maintain distinct compliance policies and enforcement standards while still sharing data with other agency systems for streamlined coordination and response management. In some cases, the exchange of evidence packages and related contextual information between agency system(s) 130 may enable coordinated determination and execution of corrective actions across multiple agencies. In some cases, compliance monitoring environment 100 may include one or more cloud server(s) 120. In some examples, cloud server(s) 120 may operate to support the edge device(s) 104, agency system(s) 130, and/or other compliance monitoring components from a remote location and/or network, such as a remote network, the cloud, a backend, a remote, or any distributed computing environment. It is noted that the structural and functional aspects of the cloud server(s) 120 may wholly or partially exist within the same or different cloud servers.

In some examples, cloud server(s) 120 may include, host, operate, and/or implement one or more object detection systems (e.g., object detection system 122b), one or more context systems (e.g., context system 124b), and/or one or more query system(s) 126a. As noted with respect to object detection system 122a, object detection system 122b may process image data acquired from one or more edge devices 104 to determine or detect and monitor compliance matters (e.g., detect a compliance violation; confirm resolution of compliance matter; etc.). For example, object detection system 122b may use one or more AI/ML models (e.g., object detection model(s)) to identify one or more objects, structures, environmental conditions and/or other visual indicators within the image data. In some instances, object detection system 122b may annotate the image data to visually indicate the location, boundaries, or other identifying markers of the detected objects, structures, or environmental conditions. Cloud server(s) 120 may generate an evidence package indicating the presence of a compliance violation, portions of image data that are associated with object(s), structure(s), environmental condition(s), visual indicator(s) associated with the compliance violation, and/or portions of the annotated image data associated with the compliance violation. The evidence package may be transmitted to agency system(s) 130 and/or stored for further analysis.

In some cases, context system 124b may implement process(es) related to context analysis of a compliance matter. The process(es) related to context analysis may include, but is not limited to, processing the image data captured by the edge device(s) 104 to determine or extract context information related to the compliance matter. As described herein, the contextual information may include, for example, the type of violation, characteristics of the violation (e.g., level of damage, level of cleanliness, level of maintenance, level of graffiti, location of the violation, the time the violation was detected), and/or the overall severity of the violation. In some instances, the context analysis process(es) may include generating a coherent and contextually relevant language-based content based on the context information. As described herein, the content may summarize or characterize the compliance violation. For example, context system 124b may use one or more AI/ML models (e.g., generative AI model(s)) to generate an evidence package that may classify the type of violation, assess the severity of the violation, and/or determine characteristics of the violation, such as levels of damage, cleanliness, maintenance deficiencies, and associated timestamp(s). In some aspects, the contextual information determined by context system 124b may be included in the evidence package generated by cloud server(s) 120 along with the image data and annotated image data.

In some examples, edge device(s) 104 may include, host, and/or execute a query system 126a configured to process natural language queries or prompts related to compliance matters. As described herein, query system 126a may be configured to receive a natural language query from a user, such as a field inspector or authorized agency personnel, via an interface on the edge device(s) 104. The natural language query may relate to one or more compliance assets in the environment, such as objects, structures, environmental conditions, or other visual indicators captured in image data obtained by the edge device(s) 104.

In some implementations, query system 126a may include or interface with one or more AI/ML model(s), such as a vision language model adapted for a specific compliance-related domain, to interpret, reason over, and respond to the natural language query. The query system 126a may perform one or more prompt refinement or reformulation operations to align the user-submitted query with the domain for which the AI/ML model is adapted. Such refinement or reformulation may incorporate contextual information determined by the edge device(s) 104, including attributes or properties of detected objects, operational thresholds, and policy-specific terminology relevant to the compliance matter.

In some examples, query system 126a may access one or more locally stored contextual data sources on the edge device(s) 104, such as structured asset data, policy excerpts, or recent scene observations, to support the refinement process. The refined or reformulated query may then be processed in conjunction with corresponding visual input to generate a compliance-aware output, such as an answer to the user's question, an assessment of compliance status, or an indication of relevant policies or thresholds. In some cases, query system 126a operating on edge device(s) 104 may generate and transmit the resulting output, along with any associated contextual information or evidence package data, to agency system(s) 130 or cloud server(s) 120 for further analysis, archival, or determination of action items.

In some examples, cloud server(s) 120 may include, host, and/or execute a query system 126b that is functionally similar to query system 126a described herein with respect to edge device(s) 104. Query system 126b may be configured to process natural language queries or prompts related to compliance matters, including queries received directly from agency system(s) 130, edge device(s) 104, or other authorized client systems. As with query system 126a, query system 126b may include or interface with one or more AI/ML model(s), such as a domain-adapted vision language model, to interpret, reason over, and respond to the natural language query. Query system 126b may implement prompt refinement or reformulation operations to align the received query with the relevant compliance-related domain, including the injection of operational thresholds, policy-specific terminology, or contextual information.

In some cases, query system 126b may have access to larger or more comprehensive contextual knowledge sources than may be locally stored on an edge device, such as extensive historical compliance records, broader policy repositories, or high-volume structured datasets aggregated from multiple jurisdictions. This extended access may allow query system 126b to incorporate additional policy clauses, historical examples, or environmental context into the refined or reformulated query.

In some instances, query system 126b may process the refined natural language query together with corresponding visual or contextual input to generate a compliance-aware output. The output may include, for example, a direct answer to the query, an assessment of compliance status, or references to relevant policy clauses or compliance thresholds. In some examples, the output may be used to generate or update an evidence package, which may then be transmitted to agency system(s) 130 for review, archival, or determination of one or more corrective actions or action items.

In some examples, edge device(s) 104 and cloud servers 120 may each include, implement and/or host a respective copy or version of an object detection system, a query system, and/or a context system. That is, the processing of image data to identify objects, identify context, process and respond to natural language queries or prompts, and/or generate an evidence package may be performed independently by either edge device(s) 104 and/or cloud serve(s) 120. In some aspects, the processing of image data to identify objects, identify context, process and respond to natural language queries or prompts, and/or generate an evidence package may be shared or distributed between edge device(s) 104 (e.g., using object detection system 122a, context system 124a, and/or query system 126a) and cloud server(s) 120 (e.g., using object detection system 122b, context system 124b, and/or query system 126a).

Furthermore, object detection system 122a, object detection system 122b, context system 124a, context system 124b, query system 126a, and/or query system 126b may each include, implement, and/or host one or more servers, computers, models and/or neural networks (e.g., artificial intelligence (AI) and/or machine learning (ML) models and/or neural networks, statistical models, etc.), algorithms, software applications, software engines, software modules, software services, software code/logic, software components, processors and/or processing circuitry (e.g., central processing units (CPUs), digital signal processors (DSPs), graphics processing units (GPUs), image signal processors (ISPs), microprocessors, processor cores, system-on-chip (SOC) devices, application-specific integrated circuits (ASICs), field-programmable gate arrays (FPGAs), integrated circuits, etc.), software and/or hardware elements, software platforms, and/or any other hardware and/or software components.

In some aspects, the configurations for the distributed processing of the image data and/or natural language queries or prompts may be based on computational capabilities and/or resources of the edge device(s) 104 and/or cloud server(s) 120, as well as, network conditions, latency constraints, and/or the specific compliance monitoring requirements of a given jurisdiction. In some instances, the configurations and/or determinations for the distributed processing of the video data and/or image data and/or the distributed processing of natural language queries or prompts captured by edge device(s) 104 may be based on computational capabilities of the edge device(s) 104 and/or cloud server(s) 120, as well as, network conditions, latency constraints, and/or the specific compliance monitoring requirements of a given jurisdiction.

In some examples, edge device(s) 104 may determine when process(es) related to compliance detection and/or monitoring, query processing, and/or process(es) related to context analysis should be offloaded to cloud server(s) 120. For example, edge device(s) 104 may monitor computational workload metrics, such as processing time, memory consumption, CPU/GPU utilization, power usage, and data complexity, to determine whether the process(es) related to a compliance matter, the process(es) related to query processing, and/or the process(es) related to the context analysis exceed a predefined processing threshold. In instances where the process(es) related to a compliance matter, query processing, and/or the process(es) related to the context analysis are determined to exceed a predefined processing threshold, edge device 104 may offload the process(es) to cloud server(s) 120 for execution. Cloud server(s) 120 may implement the offloaded process(es) (e.g., execute AI/ML model(s) to perform object detection, classification, compliance violation determination, query refinement or reformulation, query resolution, context analysis, and/or generation of evidence package).

In some examples, the process(es) executed by edge device(s) 104 and/or cloud server(s) 120 may further include determining one or more action items or corrective actions associated with a detected compliance matter. Such determinations may be based on one or more attributes identified for an object, structure, or environmental condition within the environment. For example, upon detecting a compliance violation and determining its associated attributes and contextual information (e.g., obstruction type, level of damage, severity, location, time of detection), edge device(s) 104 and/or cloud server(s) 120 may generate an evidence package that specifies one or more action items to remediate the violation. The determination of the corrective actions can include comparing the identified attributes and contextual information against applicable compliance-related data stored and/or managed by agency system(s) 130. As described herein, such compliance-related data may include, but is not limited to, jurisdictional thresholds, service-level agreements (SLAs), internal agency policies, inspection standards, zoning rules, and environmental ordinances. In some cases, the action items may be prioritized based on the assessed urgency, such as violations impacting safety, accessibility, or critical infrastructure being designated for immediate remediation, while less critical issues may be scheduled for resolution during routine maintenance. This determination process may be performed locally by the edge device(s) 104 or remotely by the cloud server(s) 120, depending on processing thresholds and system configurations, and the resulting evidence package, including the action items, may then be transmitted to one or more agency system(s) 130 for execution or further processing.

Figure 4A:
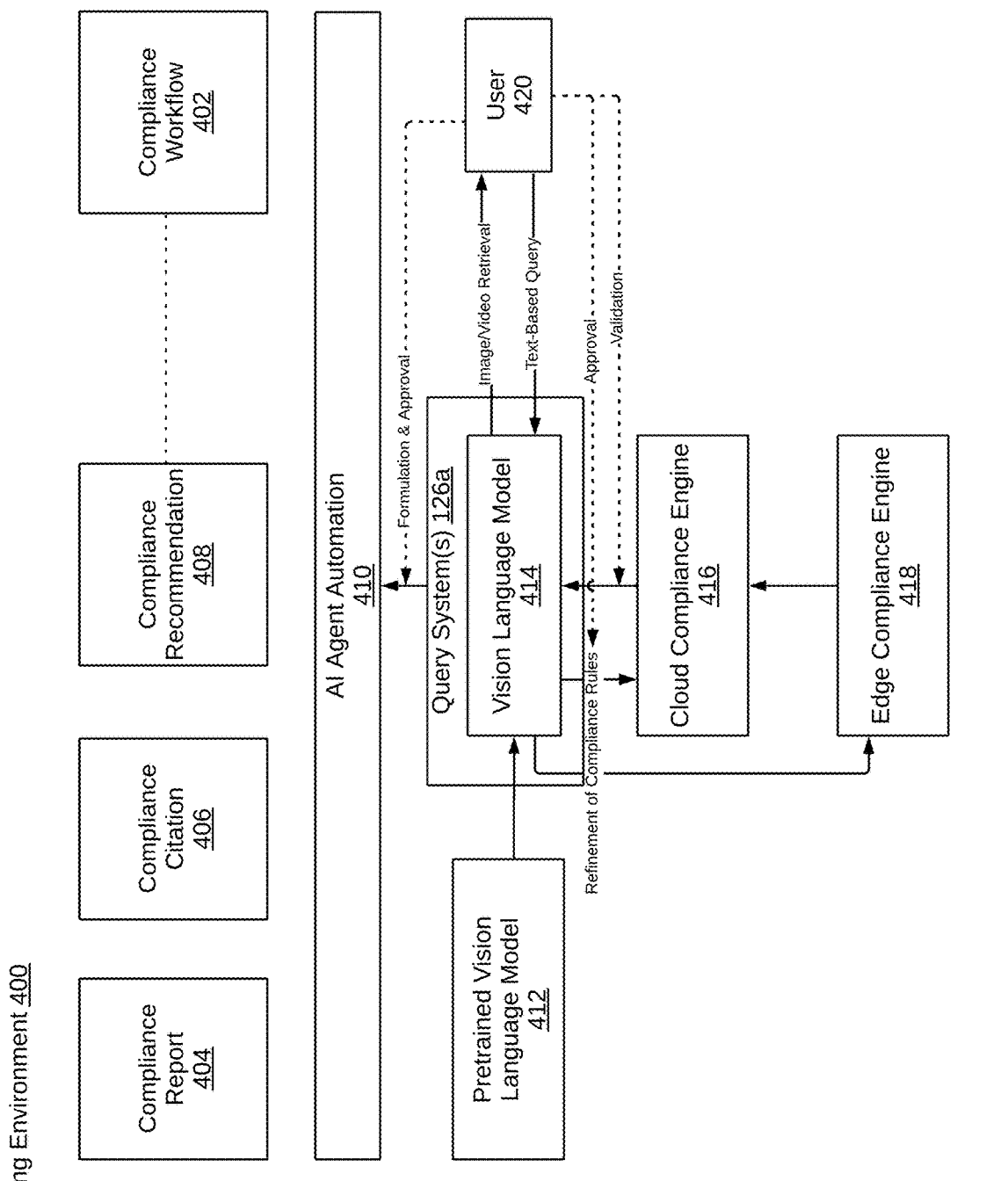
FIG. 4A illustrates an example block diagram of a compliance framework, according to some examples of the present disclosure.

FIG. 4A illustrates a block diagram of a compliance framework 400 that may facilitate the automated detection, analysis, and enforcement of compliance matters using artificial intelligence-driven automation. In some configurations, the compliance framework 400 may integrate multiple components, including compliance workflows, AI-based automation, and/or one or more AI/ML model(s), such as vision language model(s). As illustrated in FIG. 4A the compliance framework 400 may include distributed compliance engines that can operate in both cloud and edge environments. In some cases, the compliance framework 400 may include query system(s) 126a. As described herein, query system(s) 126a may facilitate interactions with the AI/ML model(s) (e.g., vision language model(s), such as vision language model 414) using natural language prompts or queries.

In some aspects, the compliance workflow 402 may serve as an operational pipeline within the compliance framework 400 and can enable the identification, reporting, and resolution of compliance matters. In some cases, the compliance workflow 402 may include a compliance report 404, a compliance citation 406, and/or a compliance recommendation 408. In some examples, the compliance report 404 may document detected compliance issues based on processed image and contextual data. In some instances, the compliance citation 406 may be generated when the system determines that a regulatory or policy violation has occurred, which can be used to enable automated enforcement actions such as issuing warnings, penalties, or repair requests. In some examples, the compliance recommendation 408 may provide suggested corrective actions, which can be based on predefined regulatory requirements, historical enforcement data, and/or real-time environmental conditions. For example, if an illegally parked vehicle is detected in a restricted zone, the compliance framework 400 can be used to generate a compliance citation while also issuing a recommendation to dispatch enforcement personnel for further action. In some cases, the compliance report 404, the compliance citation 406, and/or the compliance recommendation 408 can be included as part of the evidence package discussed in connection with FIG. 1.

In some configurations, the compliance framework 400 may incorporate artificial intelligence (AI) agent automation 410 (e.g., to enhance efficiency and accuracy in compliance evaluations). In some examples, AI agent automation 410 can leverage machine learning models, rule-based decision engines, and adaptive learning algorithms to improve compliance assessments.

In some cases, AI agent automation 410 may continuously learn from new compliance data, refining its ability to detect compliance violations (e.g., unauthorized construction, improper waste disposal, neglected maintenance of public infrastructure, etc.). Additionally, in some examples, AI agent automation may implement an agentic AI layer that can generalize interactions and detected patterns to enhance compliance rules. For instance, when similar violations are repeatedly identified, the compliance framework 400 may propose automated rule generalizations, such as stricter detection thresholds for waste accumulation violations or revised maintenance assessment parameters. In some configurations, the system may solicit or receive human operator approval before implementing these rule changes, ensuring that modifications align with regulatory policies and enforcement protocols.

In some aspects, the compliance framework 400 may also include a pre-trained vision language model 412 configured to process image and textual data for improved compliance monitoring. The pre-trained vision language model 412 may be trained on large-scale datasets and can recognize objects, conditions, and compliance-related elements, such as faded traffic signs, obstructed sidewalks, improperly disposed hazardous materials, and deteriorating road surfaces, among many others. In some instances, the vision language model 414 may further refine compliance determinations by correlating detected visual elements with textual descriptions, regulatory standards, and enforcement policies. In some cases, the vision language model 414 may facilitate the refinement of compliance rules by updating its interpretations based on, for example, new legal guidelines, municipal policies, and/or user-provided feedback. In some implementations, vision language model 414 may be included as part of query system(s) 126a to facilitate prompt-based or query-based analysis and query resolution. In one illustrative example, if a city updates its zoning regulations to prohibit certain types of outdoor advertising, the vision language model 414 can adjust its detection parameters to identify and flag non-compliant billboards. In another example, if safety thresholds for pothole depth change, the model may recalibrate its assessments to ensure compliance with the updated criteria.

In some configurations, the compliance framework 400 may include a vision language model 414 configured to process image and textual data for improved compliance monitoring. In some cases, the vision language model 414 can include one or more separate models while in other configurations the vision language model 414 may be implemented with the pre-trained vision language model 412. In some examples, the vision language model 414 may allow for image and video evidence retrieval and investigation.

In some aspects, the vision language model 414 may support searches or queries related to compliance matters. In some instances, vision language model 414 may form part of query system(s) 126a to interpret one or more natural language queries provided by one or more users and/or support compliance investigation. In some cases, a user 420 may interact with the vision language model 414 to submit text-based queries, retrieve image and video data, and refine compliance rules. For instance, vision language model 414 may support semantically rich natural language queries that can enable user 420 to search for compliance-related events with high specificity, including quantitative measures. In one example, user 420 may submit a query such as "Is the garbage container in the photo broken?" to verify whether an object exhibits signs of structural damage. In another example, user 420 may submit a query such as "How many garbage bags are on the side of the trash can?" to enable the system to extract numerical counts from image data. In some cases, the system may also respond to compliance-related condition assessments, such as "Is the crack in the ADA warning pad more than half the size of the pad?" allowing for precise measurements that aid in compliance determinations.

In some examples, the vision language model 414 can be trained to address the semantic ambiguity and dynamic formation aspects of object definition. For instance, vision language model 414 (e.g., in the edge device and/or on the server) can detect and recognize a variety of different objects of interest that may be associated with a compliance matter irrespective of size variations, sematic ambiguities, composition (e.g., dynamic composition), and/or form (e.g., fixed form or non-fixed form). In some aspects, the implementation of the vision language model 414 can be used to adapt compliance framework 400 to changes in requirements for compliance matters (e.g., compliance framework 400 can adapt to semantically ambiguous requirements lacking a specific definition). For example, vision language model 414 can be used to extract examples of compliance matters that can be used to identify semantically ambiguous compliance issues. In some instances, the vision language model 414 may leverage pretrained embeddings, reinforcement learning, or continuous fine-tuning on new datasets to adapt to evolving regulatory requirements.

In some cases, as noted above, the vision language model 414 can detect and interpret objects of varying sizes. For example, vision language model 414 can be used to identify a relatively small object (e.g., fire hydrant, traffic sign, traffic light, etc.) versus a relatively large object (e.g., bus shelter, billboard, etc.).

In some aspects, the vision language model 414 can detect dynamic composition of objects or environments, allowing it to analyze and interpret evolving patterns or irregular formations that may indicate compliance issues. In some cases, dynamic composition may refer to the evolving nature of environmental conditions or object formations that can impact compliance assessment (e.g., transient obstructions, material accumulations, temporal changes in object state, etc.). In one illustrative example, the vision language model 414 can identify sand accumulation on roadways or sidewalks that may obstruct pedestrian pathways or reduce traction. In some cases, vision language model 414 may differentiate between natural terrain and unnatural obstructions caused by weather events. In another example, the model can recognize drainage issues by detecting water pooling patterns, differentiating between temporary water accumulation following rainfall and persistent waterlogging that indicates a blocked drainage system. In some cases, the vision language model 414 can distinguish between temporary obstructions, such as stacked construction materials or improperly placed waste, and permanent compliance issues, such as illegal dumping sites.

In some configurations, the vision language model 414 can recognize non-fixed form objects (e.g., object or visual element that can change in appearance over time). In some aspects, the model may utilize temporal analysis, comparing sequential image frames, historical compliance records, and/or predictive modeling to determine whether an evolving object may require regulatory intervention. For example, vision language model 414 can be configured to detect graffiti on traffic signs or walls and determine a severity level (e.g., whether the markings obscure critical regulatory information). In some cases, vision language model 414 can track the progressive deterioration of graffiti, distinguishing between temporary markings (e.g., chalk art) and permanent defacement that may require enforcement action. Additional examples of non-fixed form objects or visual elements that may be identified by vision language model 414 include, but are not limited to, garbage and litter (e.g., discarded materials with varying shape/location), environmental elements (e.g., smoke, fog, airborne particles), vegetation overgrowth (e.g., trees, bushes, vines that obstruct traffic signs, sidewalks, or public infrastructure).

In some examples, vision language model 414 can be configured to implement proactive compliance enforcement by anticipating issues before they escalate. For instance, vision language model 414 may detect early signs of asphalt cracking, minor surface degradation, and/or uneven wear of a road surface and it may analyze historical data to determine whether past cases of similar degradation led to pothole formation. By correlating data such as temperature fluctuations, traffic patterns, and/or road wear trends, the model can predict areas that are high risk for pothole development and initiate proactive corrective action (e.g., preventative sealing, resurfacing treatments, etc.).

In some configurations, the vision language model 414 can make detections that are context-aware to process semantic ambiguity. For example, the vision language model 414 can differentiate between tire waste and tires on functional vehicles (e.g., by leveraging contextual analysis, cross-referencing object placement, surrounding environment, and/or historical data to refine classification). For instance, if a tire is detected in a scrapyard, it may be classified as expected waste, whereas a similar tire on a public roadway may be flagged as an illegal dump.

In some cases, the model may also use multi-frame analysis to distinguish between temporary obstructions (e.g., a tire that has rolled onto a sidewalk) versus persistent compliance issues (e.g., an abandoned tire left for weeks). Additionally, in some examples, the vision language model 414 can process compliance-related imagery to detect and report violations in or near real-time, while in other configurations, batch processing may be used for retrospective analysis of compliance trends. In real-time processing, the vision language model 414 can detect compliance issues immediately, such as identifying an obstructed traffic sign and issuing an alert. In batch processing, compliance violations can be analyzed retrospectively, allowing agencies to review long-term trends, such as recurring sanitation violations in a specific location. In some instances, compliance framework 400 may switch between real-time and batch modes based on computational constraints, network availability, or jurisdictional requirements.

In some instances, user 420 may interface with the compliance framework 400 to provide approval and validation of compliance determinations before the system issues citations, reports, or enforcement directives. In one example, a municipal inspector may review automatically generated compliance citations for streetlight outages and approve enforcement actions before they are dispatched.

In some cases, the compliance framework 400 may distribute computational workloads across cloud-based and edge-based environments. In some examples, a cloud compliance engine 416 may process high-volume compliance data using cloud computing resources (e.g., to enable large-scale regulatory analysis and cross-agency coordination). In some aspects, the cloud compliance engine 416 may facilitate centralized compliance monitoring for multiple municipalities or government agencies, allowing for shared enforcement data and jurisdiction-wide compliance tracking. In some examples, the cloud compliance engine 416 can include object detection system 122*b* and/or context system 124*b*, as discussed in connection with FIG. 1.

In some configurations, an edge compliance engine 418 may operate on local edge devices, allowing for real-time compliance monitoring without requiring constant cloud connectivity. The edge compliance engine 418 may execute AI models directly on devices such as smart cameras, drones, robots, traffic sensors, and mobile enforcement units, reducing network latency and enabling rapid compliance determinations. For example, a traffic monitoring system installed at an intersection may use the edge compliance engine 418 to detect and document illegal vehicle encroachments into pedestrian crosswalks, triggering immediate alerts for law enforcement. In some instances, the edge compliance engine 418 can include object detection system 122*a* and/or context system 124*a*, as discussed in connection with FIG. 1.

Figure 4B:
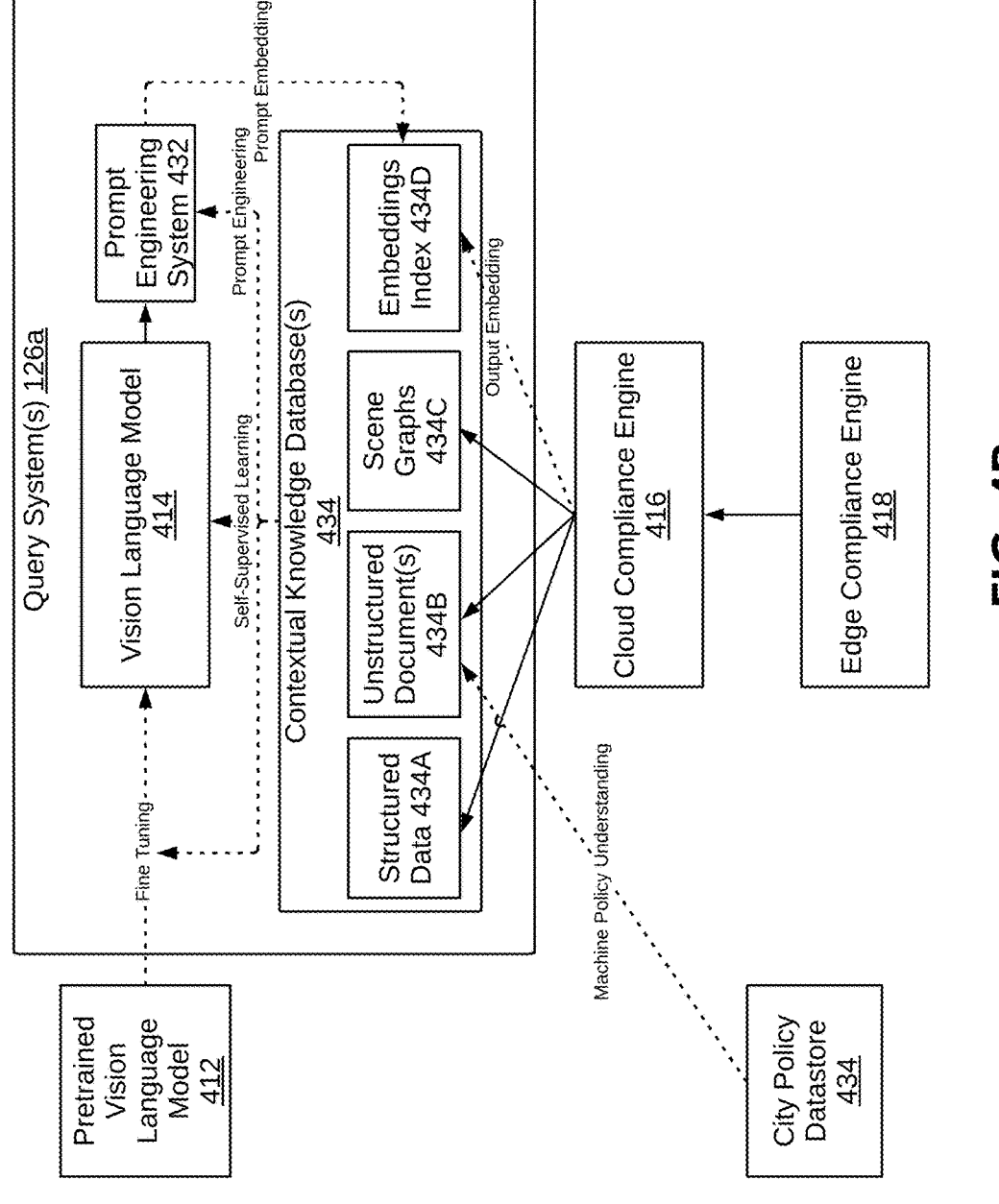
FIG. 4B illustrates an example block diagram of a query system included in a compliance framework, according to some examples of the present disclosure.

FIG. 4B illustrates an example block diagram of a query system, such as query system(s) 126*a*, that may be included in the compliance framework 400 described with respect to FIG. 4A. As described herein, the query system and its associated components and processing layers, such as one or more AI/ML model(s), may be configured to process natural language queries or prompts provided by one or more users. The natural language queries may be related to one or more objects, structures, environmental conditions, and/or any other visual indicators within an environment that may be associated with a compliance matter (hereinafter "compliance-related asset(s)"). For example, the AI/ML model(s) may interpret, reason over, and respond to natural language queries or prompts provided by the user(s).

Moreover, the AI/ML model(s) may be adapted or configured for a domain (hereinafter a "domain specific AI/ML model(s)"), such as a domain associated with compliance matters (e.g., safety compliance matters, regulatory compliance matters, service compliance matters, traffic compliance matters, permit compliance matters, community compliance matters, etc.). For example, pre-trained vision language model 412 may be a general-purpose vision-language model. Moreover, pre-trained vision language model 412 may be adapted and/or configured into a domain specific vision language model, such as vision language model 414. Further, the domain specific vision language model may be adapted and/or configured to interpret, reason over, and respond to natural language queries or prompts provided by the user(s) related to a domain, such as a domain associated with compliance matters. Although the present disclosure describes examples related to the adaptation or configuration of AI/ML model(s), such as vision language model 414, for compliance-related domains, it should be understood that the disclosed technology may be applicable to any domain in which natural language understanding, visual reasoning, and context-aware decision-making are beneficial.

As shown and described in greater detail below, compliance framework 400 may include various components that enable compliance framework 400 to adapt and configure a general purpose AI/ML model to a domain specific AI/ML model, such as, but not limited to prompt engineering system 432 and/or one or more contextual knowledge databases 434. Moreover, compliance framework 400 may include various processes that enable compliance framework 400 to adapt and configure a general purpose AI/ML model to a domain specific AI/ML model, such as but not limited to, domain-specific fine tuning operations, such as using labeled training data aligned with compliance matters, accessing and leveraging compliance-related data from one or more contextual knowledge bases, including structured data, unstructured data, scene graph(s), and/or one or more indices, to refine or reformulate user-submitted natural language queries, implementing one or more self-supervised learning processes, such as using time-series imagery to infer condition transitions over time without manual labeling, and/or performing MPU processes to extract regulatory rules or condition-action logic from policy documents or SLA contracts and encode such rules as structured logic for model inference or prompt interpretation. The described components and processes may enable a domain specific AI/ML model(s), such as vision language model 414, to interpret natural language queries more accurately and return outputs that are both contextually relevant and aligned with the operational and regulatory expectations of the applicable domain.

As described herein, a general-purpose AI/ML model (e.g., a vision-language model such as pre-trained vision language model 412), configured to process natural language queries, may be adapted or configured for a domain, such as, a domain associated with compliance-related matters, by generating a domain-specific AI/ML model (e.g., vision language model 414). In some examples, one or more fine-tuning operations may be implemented to adapt and configure the general-purpose AI/ML model into a domain specific AI/ML model. The one or more fine tuning operations may incorporate domain related data, such as, domain related visual and textual data. Further, the domain specific AI/ML model may have an improved performance in domain related tasks as compared to the general-purpose AI/ML model. For example, the performance of vision language model 414 in interpreting visual content and natural language prompts/queries associated with one or more compliance matters may be better than the pre-trained vision language model 412.

In some cases, the domain-specific AI/ML model (e.g., vision language model 414) may be adapted or configured for a domain, such as, a domain associated with compliance-related matters, by using domain relevant data stored in one or more contextual knowledge databases 434. For example, the domain relevant data may be used to generate the domain-specific version of the vision language model, such as vision language model 414. As described herein, the domain relevant data may be stored in one or more contextual knowledge databases 434 may include multiple types of data/information relevant to a domain the domain-specific AI/ML model may be adapted or configured for. For example, for a domain associated with compliance matters, the domain relevant data may include multiple types of data/information relevant to particular jurisdiction, asset category, or compliance regime. Examples of domain relevant data stored in the contextual knowledge database(s)

434 include, but are not limited to, structured data 434A or information/data organized according to a predefined schema or data model that may be stored in tabular or relational formats with clearly defined fields and relationships, such as, but not limited to asset metadata (e.g., bin type, asset location, scheduled pickup time), geographic information system (GIS) layers, and/or SLA threshold parameters, unstructured data 434B or information/data that lacks a predefined format or schema, is not organized into structured fields and/or consists of natural language content, such as, but not limited to, municipal codes, policy handbooks, enforcement protocols, and/or historic inspector notes, scene graphs 434C representing visual relationships between detected objects (e.g., trash overflowing next to park bench, sign obscured by vegetation, etc.), and embeddings index 434D, which stores previously generated prompt embeddings, image-text embedding pairs, or user-labeled feedback embeddings used to condition model behavior.

In some aspects, the domain-specific AI/ML model (e.g., vision language model 414) may be adapted or configured for a domain, such as a domain associated with compliance-related matters, by using instruction tuning. In such aspects, the fine-tuned version of the AI/ML model may be trained on a set of task-specific image-text question-answer pairs. Instruction tuning may enable the domain-specific AI/ML model (e.g., vision language model 414) to understand and generate responses that are better aligned with user intent and regulatory logic. For example, the training data used to generate the domain-specific AI/ML model for a domain related to compliance related matters may pair an image of a compliance-related asset, such as a trash bin, with a related prompt/query, such as "Is this bin overflowing?" and a corresponding response, such as "Yes, trash exceeds the rim."

In some instances, the domain-specific AI/ML model (e.g., vision language model 414) may be adapted or configured for a domain, such as, a domain associated with compliance-related matters, by using parameter-efficient fine-tuning, such as Low-Rank Adaptation (LoRA) or Quantized LoRA (QLoRA). Parameter-efficient fine-tuning may include updating a small number of weight matrices while keeping the rest of the vision language model frozen. Moreover, parameter-efficient fine-tuning may include enabling fast domain adaptation with limited computational overhead. For example, visual context, such as common bin types, overflow shapes, or road hazard patterns may be injected through low-rank matrices. This facilitates lightweight customization or fine-tuning of vision language model 414 for a domain associated with compliance matters without full retraining.

In some examples, the domain-specific AI/ML model (e.g., vision language model 414) may be adapted or configured for a domain, such as a domain associated with compliance-related matters, by adding adapter modules or using visual prompt tuning. Such techniques may enable fine tuning of the AI/ML model without altering the base weights to enable scalable multi-domain deployment. Examples of visual prompt tuning include, but are not limited to, prompt tuning (soft prompts), such as, prepending trainable token embeddings to the model input to condition the model on domain-specific semantics. In some instances, during visual prompt tuning, the prompt embeddings are learned/updated for the visual encoder (e.g., CLIP or ViT backbones) using labeled imagery such as, for a domain associated with compliance-related matters, overflowing bins, ADA ramp obstructions, or graffiti-tagged signs. These learned or updated prompt embeddings may then be injected into the vision-language pipeline to influence model attention and interpretation. For instance, for adapting and configuring a general-purpose AI/ML model for a domain associated with compliance-related matters, an adapter may be trained on city-labeled images depicting bins above 85% capacity with visible overflow. The generated domain specific AI/ML model may align visual cues with municipal waste management policies during inference. Further, examples of adding adapter modules include, but are not limited to, adding adapter layers, such as, small trainable neural network modules, into a general-purpose AI/ML model to generate the domain-specific AI/ML model. The domain-specific AI/ML model may specialize in domain related task(s), such as, but not limited to, trash detection or sign obstruction, and dynamically selecting or combining multiple adapter modules (e.g., adapter fusion), such as adapter modules trained for different city zones or compliance categories during inference.

In some instances, the domain-specific AI/ML model (e.g., vision language model 414) may be adapted or configured for a domain, such as a domain associated with compliance-related matters, by contrastive fine-tuning. For example, a general-purpose AI/ML model, such as pre-trained vision language model 412, may be trained to distinguish between semantically similar but regulatory-relevant differences in image-text pairs. Contrastive fine-tuning may improve classification, violation detection, and/or retrieval performance. For example, given two similar images, one image depicting a trashcan with trash within acceptable trash limits and another image depicting a trash-can with trash just over the acceptable trash limits, vision language model 414 may learn to correctly associate the non-compliant image with a violation statement. As described herein, the violation statement may be a structured or natural language output generated by the fine-tuned version of the vision language model. The structured or natural language output may indicate existence of a compliance issue or non-conformance with regulatory or policy requirements.

In some examples, the domain-specific AI/ML model (e.g., vision language model 414) may be adapted or configured for a domain, such as a domain associated with compliance-related matters, by using multimodal retrieval-augmented generation (RAG) techniques. For example, a general purpose AI/ML model (e.g., pre-trained vision language model 412) may receive both image inputs and retrieved textual materials (e.g., policy documents, municipal codes, or SLA guidelines) during training. The retrieved textual materials may be obtained from contextual knowledge database(s) 434, including unstructured data 434B or other relevant domain-specific sources. Moreover, multimodal RAG fine-tuning may enable the domain-specific AI/ML model (e.g., vision language model 414) to ground its outputs in the retrieved policy content and generate responses that are policy-aware and semantically aligned with compliance requirements. For example, in response to a prompt such as "Should this sidewalk be flagged?" vision language model 414 may retrieve a document clause specifying "a minimum of 36 inches of unobstructed pedestrian passage" and incorporate that retrieved policy into its decision-making. Moreover, vision language model 414 may generate an output including a response such as "Sidewalk should be flagged due to obstruction reducing clearance below 36 inches."

As illustrated in FIG. 4B, the compliance framework 400, such as query system 126a, may include a prompt engineering system 432 configured to support the adaptation or configuration of an AI/ML model for a particular domain. For example, prompt engineering system 432 may enable the AI/ML model(s) (e.g., vision language model 414) to process natural language queries in a manner that is aligned with domain-specific requirements, such as those associated with compliance matters. In some examples, prompt engineering system 432 may implement one or more refinement or reformulation operations to modify user-submitted queries so that they are better aligned with the semantics, terminology, or rules of the target domain. Examples of prompt reformulation or refinement may include, but are not limited to, clarifying ambiguous user intent, injecting domain-specific terminology, and/or incorporating operational thresholds. For example, a user query such as "Is this sidewalk okay?" may be reformulated into "Does the sidewalk maintain a clear width of at least 36 inches, as required for ADA compliance?"

In some examples, the refinement or reformulation operation(s) may include accessing one or more contextual knowledge databases 434 to obtain the domain-related data. Moreover, the prompt engineering system 432 may implement refinement or reformulation operation(s) to generate the reformulated/refined query based on the domain-related data. In some instances, the domain-related data may include structured data 434A. As described herein, the structured data 434A may include, but is not limited to, geographic information system (GIS) coordinates, compliance-related asset registries (e.g., based on images of compliance-related assets obtained by edge device(s) 104), inspection logs (e.g., of related service providers), and image/video metadata (e.g., timestamp, identified compliant-related asset(s), object identifiers of the identified compliance-related asset(s), location, such as geographical coordinates, camera angle, etc.). The prompt engineering system 432 may refine or reformulate the user-submitted natural language query based on the structured data 434A associated with the queried compliance-related asset(s).

For example, a user submits a query "Is this bin full?" Based on the query, prompt engineering system 432 may access the contextual knowledge database(s) 434 to obtain portion(s) of structured data 434A associated with the queried compliance-related asset(s)—the bin. Based on the portion(s) of the structured data 434A, prompt engineering system may determine domain-relevant information associated with the queried compliance-related asset(s), such as, but not limited to, the bin's location in a park zone, a fullness threshold of 85%, and a missed pickup record. Based on the domain-relevant information, prompt engineering system 432 may refine the natural language query to "Is this park waste bin over 85% full and overdue for scheduled pickup under SLA policy P-112?"

In some aspects, prompt engineering system 432 may facilitate domain-specific interactions with a domain specific AI/ML model, such as vision language model 414. As described herein, prompt engineering system 432 may be configured to generate, manage, and optimize prompts that guide the behavior of the domain specific AI/ML model when performing compliance-related tasks. In some examples, prompt engineering system 432 may enable the domain specific AI/ML model to adapt to new compliance scenarios with minimal reprogramming, maintain explainability and traceability of model behavior, and improve response performance by incorporating contextually relevant and policy-aligned prompt designs. In certain configurations, prompt engineering system 432 may operate in coordination with other components of query system(s)

126a and utilize domain-related data from contextual knowledge database(s) 434 to ensure that constructed prompts are semantically consistent with the operational, regulatory, and visual semantics of the target domain. By implementing these functions, prompt engineering system 432 may act as an intermediary layer that refines user intent and enhances the domain-specific accuracy of the outputs generated by vision language model 414.

In some cases, the domain-related data may include unstructured data(s) 434B. As described herein, in the compliance-related matter context, the unstructured data434B may include, but are not limited to, municipal codes, service-level agreements (SLAs), contractor policy documents, maintenance handbooks, regulatory enforcement protocols, or field inspector notes. The prompt engineering system 432 may refine or reformulate the user-submitted natural language query based on the unstructured data 434B associated with the queried compliance-related asset(s) or context.

For example, a user submits a query "Is this graffiti a problem?" Based on the query, prompt engineering system 432 may access the contextual knowledge database(s) 434 to obtain portion(s) of unstructured data 434B relevant to the image and/or referenced compliance-related asset(s). Based on the portion(s) of the unstructured data 434B, prompt engineering system 432 may determine domain-relevant information such as, but not limited to, a policy requiring removal of graffiti from regulatory signage within 72 hours. Based on the domain-relevant information, prompt engineering system 432 may refine the natural language query to "Does the presence of graffiti on this regulatory sign require removal within 72 hours under Municipal Code § 14-76.3?"

In some aspects, the domain-related data may include scene graphs 434C. As described herein, the scene graphs 434C may represent object-level and spatial relationships identified within a given image or video frame. The scene graphs 434C may include, but are not limited to, object adjacency (e.g., trash bin next to bench), containment (e.g., trash inside or outside of bin), obstruction (e.g., sign partially covered by foliage), or proximity relationships (e.g., waste near pedestrian area). The prompt engineering system 432 may refine or reformulate the user-submitted natural language query based on the scene graphs 434C generated for or associated with the visual content or image(s) referenced in the query.

For example, a user submits a query "Is this trash an issue in this picture?" for an image captured by edge device(s) 104. Based on the query, prompt engineering system 432 may access the contextual knowledge database(s) 434 to obtain a scene graph 434C corresponding to the image that identify spatial relationships, such as a trash bin adjacent to a bench with visible overflow. Based on this domain-relevant information, prompt engineering system 432 may refine the natural language query to "Is the waste bin adjacent to the park bench overflowing and causing litter to accumulate in a high-traffic pedestrian zone, in violation of sanitation standards?"

In some configurations, query system(s) 126a may implement one or more scene graph generation processes or operations to construct a scene graph including structured representations of relationships among visual elements detected in an image (e.g., an image captured by edge device(s) 104). As described herein, the scene graph is a machine-readable graph data structure that encodes objects (nodes), attributes, and pairwise relationships (edges) between those objects or compliance-related assets in a visual scene. For example, a scene graph may represent a situation such as "trash overflowing from bin next to park bench under shelter," where the objects "trash," "bin," "bench," and "shelter" may be individual nodes and the contextual or spatial relationships, such as "overflowing from," "next to," and "under," may be the edges connecting them.

In some examples, the scene graph generation operation(s) may include identifying and labeling compliance-related asset(s) using outputs, such as annotated image data, from, for instance, object detection system 122a. Moreover, the scene graph generation operation(s) may include extracting visual and/or spatial metadata for the identified compliance-related asset(s).

Further, the scene graph generation operation(s) may include determining domain-relevant relationship(s) between compliance-related asset pairs using, for example, but not limited to, rule-based logic, deep learning models, or relationship classifiers. The scene graph generation operation(s) may include encoding the identified compliance-related asset(s) and corresponding determined domain-relevant relationships into a graph-based format, referred to herein as scene graphs. The generated scene graphs may be stored in contextual knowledge database(s) 434 as scene graphs 434C. In some instances, the scene graph generation operation(s) may leverage domain-specific classifiers trained to detect compliance-relevant object interactions (e.g., "sign covered by vegetation," "waste beside sidewalk," "ADA ramp blocked by construction cone").

As described herein, prompt engineering system 432 may use scene graphs 434C to support domain-specific reasoning tasks including, but not limited to, prompt refinement, natural language query reformulation, visual evidence verification, and prioritization of compliance-related conditions. For example, a user may submit a natural language query "Are there any safety concerns near the school entrance?" Based on the natural language query, prompt engineering system 432 may access stored scene graphs to identify any visual relationships involving compliance-related asset(s) associated with schools (e.g., "damaged sidewalk near entrance," "garbage overflow next to gate"). Moreover, prompt engineering system 432 may reformulate the query or improve the accuracy of the resulting output generated by a domain specific AI/ML model, such as vision language model 414, based on an identified visual relationships involving objects associated with the schools.

In some instances, the domain-related data may include embeddings index 434D. As described herein, the embeddings index 434D may store vectorized representations of prompt embeddings, prior image-text pairs, and/or labeled model responses associated with specific compliance outcomes or operational rules. The embeddings index 434D may include representations derived from previously successful prompt/response interactions and may be used to identify semantically similar prior examples that inform the reformulation of new user queries. The prompt engineering system 432 may refine or reformulate a natural language query provided by a user based on one or more embeddings retrieved from the embeddings index 434D.

For instance, a user submits a natural language query "Should this light pole be fixed?" Based on the query, prompt engineering system 432 may access the contextual knowledge database(s) 434 to retrieve one or more embeddings associated with prior prompts about leaning or unstable streetlights. Based on the retrieved embedding(s), prompt engineering system 432 may determine domain-relevant information such as, but not limited to, a local ordinance requiring corrective action for poles exceeding a tilt threshold. Based on the domain-relevant information, prompt engineering system 432 may refine the natural language query to "Does the tilt angle of the light pole shown in the image exceed structural safety limits specified in code M-304, requiring corrective maintenance?"

In some configurations, compliance framework 400 may implement one or more embedding generation operation(s) to produce one or more vector representations, referred to herein as embeddings, that capture the semantic intent or meaning of natural language prompts, model outputs, or other contextual domain related data, such as contextual compliance data. As described herein, compliance framework 400 may may use the embeddings to facilitate semantic search, similarity scoring, and policy-aligned inference across historical and/or active compliance scenarios. The embeddings may be stored in contextual knowledge database(s) 434, such as, embeddings index 434D. In some instances, embeddings index 434D may use vector database technologies such as FAISS, pgvector, or Pinecone to support rapid semantic search, retrieval, and clustering. Historical embeddings stored in embeddings index 434D may represent past prompt/query scenarios, user feedback, responses of compliance framework 400 (e.g., results, decisions, or interpretations produced by the compliance framework 400 in response, such as, but not limited to, textual or structured responses from vision language model 414 to associated natural language queries, compliance determinations, visual annotations, bounding boxes or classifications produced by object detection system 122a/122b and context system 124a/124b, and/or decisions, recommendations, or citations generated by the query system 126a or agency system(s) 130 based on compliance assessments), and contextual decision records, enabling compliance framework 400 to reuse and learn from prior reasoning.

In some examples, the embeddings may include one or more prompt embeddings. The prompt embedding(s) may represent the meaning or intent of a natural language prompt (e.g., "Is this bin overflowing?") as a vector representation. Moreover, the prompt embedding(s) may be used by the compliance framework 400 for a variety of domain-specific operations. For example, the prompt embedding(s) may enable semantic search, which allows the system to retrieve semantically similar prompts from historical compliance tasks. Furthermore, the prompt embedding(s) may support clustering of prompt types, such as grouping user query patterns based on topic, asset type, or regulatory category. In some cases, the prompt embedding(s) may be used for version tracking, enabling the comparison of semantically similar prompts over time to detect changes in terminology, regulatory evolution, or user intent drift. In some aspects, the prompt embedding(s) may further support few-shot prompting, wherein exemplar prompts, or query-response pairs retrieved from contextual knowledge database(s) 434 may be injected into a current prompt to enhance the alignment, relevance, or accuracy of vision language model 414's output. In some instances, and as illustrated in FIG. 4B, prompt engineering system 432 may generate the prompt embedding(s).

In some examples, the embeddings may include one or more output embeddings. The output embedding(s) may encode the responses to specific compliance questions as a vector representation. Moreover, the output embedding(s) may serve as a basis for evaluating and enhancing system performance across compliance tasks. For example, the output embedding(s) may be used to compute similarity scores between different responses generated across similar visual or contextual inputs. Furthermore, the output embedding(s) may enable quality assessment, such as determining cosine similarity between model-generated responses and validated human-labeled ground truth. In some aspects, the output embedding(s) may support clustering of output trends, enabling the system to identify recurring violations, emerging issue types, or domain-specific anomalies. In some cases, the output embedding(s) may facilitate memory systems capable of storing and recalling previously effective outputs, thereby supporting inference consistency, policy alignment, and historical continuity in compliance determinations. In some instances, cloud compliance engine 416 may generate the output embedding(s).

In some examples, prompt engineering system 432 may include a set of configurable prompt templates that define the structure and intent of natural language queries or refined natural language queries provided to the domain-specific AI/ML model, such as vision language model 414. Each prompt template may specify one or more parameterized fields that are designed to receive domain-specific context, such as, but not limited to, a compliance-related asset/object type, compliance condition, location, and/or policy threshold. As described herein, a policy threshold may refer to a predefined quantitative or qualitative criterion derived from one or more regulatory policies, municipal codes, service-level agreements, or operational handbooks, which defines a boundary between compliant and non-compliant conditions. For instance, a policy threshold may define "overflow" as a waste bin exceeding 85% of its volume, or an ADA-compliant sidewalk as maintaining a minimum unobstructed width of 36 inches. Prompt engineering system 432 may retrieve or determine such thresholds from unstructured data 434B stored in contextual knowledge database(s) 434. Moreover, prompt engineering system 432 may use the thresholds to condition natural language queries/prompts so that the resulting outputs generated by vision language model 414, may be grounded in jurisdiction-specific enforcement rules.

In some instances, the prompt template(s) may enable reusable scaffolding for constructing prompts that are consistent, interpretable, and/or aligned with regulatory expectations. For example, a prompt template may take the form: "You are a street cleaner. Based on the image, evaluate the condition of the [asset/object type](e.g., a waste bin) and rate the severity of [condition type](e.g., damage level) using the following scale: [scale definition](e.g., 1-3)". In some cases, the template structure may be dynamically extended or tailored using prompt assembly logic and knowledge base retrieval described further below.

In some configurations, prompt engineering system 432 may include a prompt configuration interface and/or a prompt database ("Prompt DB"). The prompt configuration interface may enable authorized users, such as municipal administrators, system developers, or compliance officers, to define, modify, and manage prompt templates for different types of compliance-related asset(s), task categories, or regulatory zones. Users may adjust one or more prompt parameters (e.g., object type, severity scale, response format), via the prompt configuration interface, to tailor how vision language model 414 interprets the query and generates its output. The prompt configuration interface may support both manual prompt definition and/or programmatic configuration via an application programming interface (API). For example, a municipal inspector may access the prompt configuration interface via an agency device, such as agency device 132A, 132B, or 132N, and update a prompt template used for evaluating ADA ramp obstructions. The inspector may revise the prompt parameters to reflect a newly adopted 40-inch clearance policy and save the updated template to the prompt database. In some examples, prompt engineering system 432 may store the configured prompt templates and related metadata in a prompt database. The prompt database may store prompt text, field mappings, domain tags, usage frequency, and historical effectiveness metrics. In some aspects, prompt database entries may also be embedded into a semantic vector index, allowing for retrieval, clustering, or similarity scoring based on prompt embeddings.

In some aspects, prompt engineering system 432 may include a prompt assembly logic engine configured to dynamically generate task-specific prompts by incorporating structured data 434A and/or unstructured data 434B from contextual knowledge database(s) 434. As described herein, the prompt assembly logic may operate by selecting a base prompt template from prompt database (Prompt DB) and populating one or more template fields with domain-related data associated with the object or condition under analysis. Prompt engineering system 432 may enable query system 126a to construct, refine, or reformulate natural language prompts or queries that are domain-specific, such as prompts that align with compliance related matters (e.g., regulatory inspection criteria, service-level agreement thresholds, and/or contextual conditions tied to municipal infrastructure and public safety enforcement). For example, a natural language prompt/query may be tailored to assess whether a sidewalk meets ADA accessibility standards, whether a bus stop shelter requires maintenance due to broken panels, or whether a trash bin located in a high-traffic area exceeds overflow policy thresholds. Prompt engineering system 432 may process an image associated with the prompt/query to determine whether the image depicts a waste bin located near a school. In instances where the image depicts a waste bin located near a school, prompt engineering system 432 may retrieve structured metadata such as asset ID, GPS coordinates, and fill level from structured data 434A, and/or policy language from unstructured data 434B specifying school-zone sanitation standards. The prompt assembly logic of prompt engineering system 432 may then generate a prompt such as: "Given that bin is 93% full and located within 100 feet of a school, does this condition require immediate remediation under Policy S-82?" In some instances, prompt engineering system 432 may also retrieve domain-specific rules, thresholds, or regulatory clauses from contextual knowledge database(s) 434 and inject them into the prompt as contextual grounding. This injection may be part of the refinement or reformulation process for natural language prompts or queries to ensure that they reflect compliance policies, local enforcement rules, or operational standards with greater specificity and clarity.

In some cases, prompt engineering system 432 may implement one or more context-aware prompt selection operations to guide how prompts are assembled or selected based on environmental or situational context. As described herein, the context-aware prompt selection operation(s) may include using one or more decision rules or classifiers to select a specific prompt template, prompt type, or configuration that matches the current domain, compliance-related asset condition, or regulatory context. Moreover, the context-aware prompt selection operation(s) may include incorporating contextual cues derived from structured data 434A (e.g., zone type, asset location) and/or unstructured data 434B (e.g., policy clauses indicating critical infrastructure designations). For example, if a compliance-related asset is flagged as belonging to a high-priority enforcement zone, prompt engineering system 432 may select a more assertive prompt template that triggers urgent compliance evaluation, such as "This bin is located in a school safety zone. Based on current fill level and missed pickup history, should it be flagged for immediate service under SLA Policy P-112?"

In some instances, prompt engineering system 432 may implement one or more retrieval-augmented generation (RAG) operations to refine or reformulate a natural language query. As described herein, the RAG operation(s) may include accessing contextual knowledge database(s) 434 to obtain information/data relevant to the natural language query from unstructured data 434B, such as, but not limited to relevant clauses, standards, or regulatory policies. Moreover, the RAG operation(s) may include inserting the obtained relevant information/data into the natural language prompt or query. The embedded relevant information/data may clarify ambiguous user queries, enforce consistent terminology, and/or guide outputs generated by a domain-specific AI/ML model, such as vision language model 414. For example, a user submits a query such as "Is this bin overflowing in the image?" Based on the natural language query, prompt engineering system 432 may reformulate the natural language prompt to include retrieved policy language such as, "Policy Context: Overflow is defined as fill level >85% with visible trash beyond rim. SLA P-112 requires service within 24 hours. Based on this definition, is the bin in the image considered overflowing?" The embedded policy language may enable vision language model 414 to interpret natural language queries with greater regulatory precision.

In some configurations, RAG operation(s) may include accessing contextual knowledge database(s) 434 to retrieve domain-specific information and data relevant to a given natural language query from scene graphs 434C. As described herein, scene graphs 434C encode structured representations of objects, attributes, and relationships detected in a visual scene, such as spatial relationships, containment, or obstruction. These graph-based representations may serve as intermediate reasoning structures to inform the retrieval logic of prompt engineering system 432. For example, a user may submit a natural language query such as: "Is this sidewalk blocked?" Based on the natural language query, prompt engineering system 432 may access contextual knowledge database(s) 434 to analyze a relevant scene graph representing "vegetation overgrowth obstructing sidewalk." Based on the relevant scene graph, prompt engineering system 432 may determine that the obstruction pertains to pedestrian accessibility. Based on the determination that the obstruction pertains to pedestrian accessibility, prompt engineering system 432 may retrieve a relevant policy clause from unstructured data 434B, such as "36-inch minimum pedestrian clearance required for ADA compliance." Based on the retrieved relevant policy clause, prompt engineering system 432 may refine or reformulate the natural language query by injecting the retrieved policy clause into a natural language query. The refined or reformulated natural language query may include "Does this obstruction reduce sidewalk clearance below 36 inches in violation of ADA requirement S-106?" Vision language model 414 may process the refined natural language query in conjunction with an associated input image (e.g., from the edge device(s) 104) and its corresponding scene graph to generate a compliance-aware response such as, "Clearance is reduced to 28 inches; sidewalk does not meet ADA compliance threshold."

In some examples, prompt engineering system 432 may implement one or more prompt quality estimation operations to evaluate the effectiveness and alignment of natural language prompts or queries with intended outcomes. As described herein, the prompt quality estimation operations may include applying one or more metrics to measure the performance of the natural language prompt or query. Examples of the metric(s) include, but are not limited to, mean absolute error (MAE), accuracy against ground-truth labels, and user validation scores. In some instances, the metric(s) may be applied across different domains, asset types, or policy categories. In some examples, prompt engineering system 432 may implement the prompt quality estimation operation(s) to determine, for a refined or reformulated natural language prompt, which templates, phrasings, and/or configurations yield the most accurate and policy-consistent results. For example, a natural language prompt or query for assessing graffiti severity may produce inconsistent responses. Prompt engineering system 432 may flag it for revision, leading to a refined version such as: "Evaluate the visibility and coverage area of graffiti on regulated surfaces. Rate the severity from 1 (minor) to 3 (severe) based on policy G-12."

In some instances, prompt engineering system 432 may implement one or more few-shot or example-based prompting processes or operations to improve the accuracy and response consistency of a domain-specific AI/ML model, such as, vision language model 414. Few-shot prompting or example-based prompting operation(s) may include embedding one or more prior examples, consisting of image-text pairs, question-answer pairs, or annotated image data, into a natural language query or prompt. The natural language query or prompt with the embedded prior example(s) may provide to the domain-specific AI/ML model with representative guidance aligned to the specific domain or task. As described herein, prompt engineering system 432 may obtain the prior example(s) from contextual knowledge database(s) 434, such as from embeddings index 434D or other stored prompt-result histories. For instance, when evaluating the condition of a crosswalk, prompt engineering system 432 may retrieve labeled example(s) such as, an Image of a worn crosswalk paint with a label indicating the lines are faded and partially missing and repainting is recommended under traffic marking standards. A related natural language, such as "does this image indicate a worn crosswalk," may then be refined or reformulated with the labeled example(s).

In some configurations, prompt engineering system 432 may perform semantic prompt matching using embedding-based similarity search to identify and reuse previously effective natural language prompts or queries that are semantically similar to the user-submitted query. In some examples, natural language prompts previously stored in the prompt database and/or embeddings index 434D may be embedded as vector representations (hereinafter "prompt embeddings"), allowing query system 126a to compute similarity scores and retrieve the most relevant prompt embedding. This enables prompt engineering system 432 to dynamically retrieve of templates or formulations that have previously demonstrated alignment with the queried compliance condition or asset type. As part of prompt refinement, semantic prompt matching may support consistent language use, reduce redundant engineering effort, and improve policy traceability. For example, a user submits a natural language query about sidewalk obstruction. Prompt engineering system 432 may retrieve a similar prompt embedding, such as a prompt embedding associated with a prior template successfully used in similar ADA compliance evaluations (e.g., a prompt embedding for "Assess whether the object in the sidewalk path reduces clear passage below the required 36-inch threshold. Flag if ADA criteria are not met.")

In some configurations, the domain-specific AI/ML model, such as, vision language model 414, may process the refined or reformulated prompt. As described herein, the domain-specific AI/ML model may be adapted or configured for one or more domains (e.g., compliance related domains, such as, but not limited to, municipal infrastructure (e.g., roads, signage, waste bins), public safety enforcement (e.g., hazard detection, ADA compliance), service-level agreement (SLA) tracking (e.g., response times, cleanliness metrics), and community standards enforcement (e.g., graffiti removal, maintenance policies)). Moreover, vision language model 414 may process multimodal input, including the refined prompt/query and one or more images (e.g., captured by edge device(s)). Further, vision language model 414 may apply object detection, semantic parsing, spatial reasoning, and/or policy interpretation based on domain-specific training.

In some examples, the domain-specific AI/ML model, such as, vision language model 414, may generate an output generated by the domain-specific AI/ML model based on one or more aspects of the refined or reformulated prompt/query. The output may include, but is not limited to, natural language responses, structured compliance findings, or citation-ready violation statements. For example, a user submits a query "Is this sidewalk okay?" Moreover, prompt engineering system 432 may, as described herein, reformulate the query into "Does the sidewalk maintain a clear width of at least 36 inches, as required for ADA compliance?" Further, vision language model 414 may process the refined query along with the associated image data, and in some instances, detect the boundaries of the sidewalk using image segmentation or object detection, identify any obstructions (e.g., trash, vegetation, parked bicycles), and/or compute a measurement of the passable clearance. Based on the refined query, vision language model 414 may compare the measurement against the threshold of 36 inches. Based on the comparison, vision language model 414 may generate an output a response "Sidewalk is obstructed; clearance is reduced to 28 inches, below the required 36-inch minimum under ADA standards."

In some aspects, the domain-specific AI/ML model, such as, vision language model 414, may also associate an output generated by the domain-specific AI/ML model with corresponding structured evidence (e.g., bounding boxes, overlay annotations, or metadata) to support downstream actions. Examples of downstream actions may include, but are not limited to, automated citation generation, agency review, or SLA reporting. The output and structured evidence generated by the domain-specific AI/ML model may be provided to one or more agency system(s) 130. As described herein, agency system(s) 130 may determine and/or implement one or more action items associated with an identified compliance matter or queried object (e.g., a waste bin, light pole, sidewalk, etc.).

For example, based on a refined natural language query, vision language model 414, as described herein, may determine a waste bin is non-compliant due to overflow exceeding the rim by 12 inches and there was a missed pickup event relative to a predefined service-level agreement. Vision language model 414 may generate an output such as, "Overflow of 12 inches detected; scheduled pickup missed on 07/04/2025; bin location: Park Zone 4, Asset ID 2398." The output and accompanying visual annotations (e.g., bounding boxes around overflow area) may be transmitted to agency system(s) 130 for further processing. Based on the received output, agency system(s) 130 may determine and/or implement one or more downstream actions or action items. Such actions may include, for example, automatically issuing a violation notice to the relevant service provider, updating the bin's service schedule to prioritize immediate collection, and/or generating a task order to dispatch a municipal cleanup crew.

In some examples, compliance framework 400 may implement one or more machine policy understanding (MPU) operations to enable query system(s) 126a (e.g., a domain-specific AI/ML model, such as vision language model 414 and/or prompt engineering system 432) to interpret, apply, and reason about domain-specific policy data, such as jurisdiction-specific policies and regulatory documentation, relevant to compliance-related tasks. Moreover, the MPU operation(s) may include processing the domain-specific policy data stored by agency system(s) 130. As described herein, agency system(s) 130 may include one or more databases or datastores configured to store and manage the domain-specific policy data, including, but not limited to, municipal codes, regulatory clauses, policy documents, service-level agreements (SLAs), jurisdictional policies, agency rules and requirements, inspection standards, zoning rules, and environmental ordinances. In some instances, the domain-specific policy data stored and managed by agency system(s) 130 may serve as a data source for unstructured data 434B stored in contextual knowledge database(s) 434. In some aspects, unstructured data 434B may contain the actual text of the jurisdiction-specific policies and regulatory documentation. Moreover, agency system(s) 130 may provide access control, versioning, and structured organization of the underlying domain-specific policy data.

In some aspects, the MPU operation(s) may include a rule extraction process. As describe herein, the rule extraction process may include using one or more natural language processing models, such as a domain-specific AI/ML model (e.g., vision language model 414), to parse policy data stored in unstructured data 434B. Based on the parsed policy data, the natural language processing model(s) may extract structured rule representations. The structured rule representations maybe associated with a natural language prompt. For example, vision language model 414 and/or supporting components of query system(s) 126a may process or analyze a policy clause from the policy data included in unstructured data 434B "Bins must be serviced if they exceed 85% capacity and exhibit visible overflow." Moreover, vision language model 414 and/or supporting components of query system(s) 126a may extract a rule representation "overflow=>85%+visible spillage" from the policy clause. The extracted rule representation may reflect operational thresholds or compliance conditions defined in jurisdiction-specific policies and regulatory documentation. Vision language model 414 may use the extracted rules to guide one or more corresponding model behaviors, such as, but not limited to, identifying relevant visual cues (e.g., checking for overflow), comparing observed conditions against defined compliance thresholds (e.g., fullness percentage), classifying the scenario as compliant or non-compliant, selecting or prioritizing which conditions to highlight in the output, and/or generating a policy-grounded natural language response.

In some cases, the MPU operation(s) may also include runtime rule retrieval. For example, when a user submits a natural language prompt or query, prompt engineering system 432 may perform semantic search operations over embeddings derived from policy data, such as jurisdiction-specific policies and regulatory documentation stored in unstructured data 434B. Retrieved policy clause(s) may reflect applicable thresholds, procedural requirements, or rule conditions relevant to the context of the user-submitted query. Prompt engineering system 432 may use the retrieved policy clause(s) to refine or reformulate the natural language prompt or query, such as by injecting the rule into the natural language prompt. For example, a natural language prompt "Is this bin okay?" may be reformulated to: "Is this bin over 85% full and visibly overflowing in violation of SLA guideline P-112?"

In some instances, the MPU operation(s) may include one or more operations or processes that align the output of a domain-specific AI/ML model, such as vision language model 414, with rule-based logic extracted, derived or determined from the domain-specific policy data. As described herein, the extracted rules may reflect specific policy conditions, thresholds, and/or compliance criteria. Based on the extracted rules, the domain-specific AI/ML model may reason about visual and contextual data to generate relevant responses. For example, a user may submit a natural language query such as "Is this sidewalk okay?" Based on this query, prompt engineering system 432 may retrieve a policy clause related to the natural language query from unstructured data 434B stating that "ADA-compliant sidewalks must maintain at least 36 inches of unobstructed clearance." Based on the policy clause, prompt engineering system 432 may refine the query to: "Does the sidewalk in this image maintain a minimum clearance of 36 inches in accordance with ADA guidelines?" Vision language model 414 may then analyze a corresponding visual input (e.g., from edge device(s) 104) and generate an output such as, "Flagged as non-compliant due to 28-inch clearance; below required ADA minimum of 36 inches."

In some examples, the MPU operation(s) may include processes that support auditability and review by, for example, associating each compliance determination rendered by a domain-specific AI/ML model with the policy clause(s) or structured rule(s) that informed the determination. The associated policy clause(s) may be retrieved from policy data stored in unstructured data 434B and serve as a traceable basis for an output of the domain-specific AI/ML model. These associations may be logged by agency system(s) 130 and included in generated compliance reports, enabling inspectors or agency personnel to verify how a determination was made.

In some aspects, the MPU operation(s) may improve a domain-specific AI/ML model, such as vision language model 414, performance in ambiguous or borderline compliance scenarios. The domain-specific AI/ML model may reference structured rules derived from jurisdiction-specific policies and regulatory documentation to resolve ambiguous prompts or visual inputs. For example, a user may submit a natural language prompt "Is the damage to this bench significant?" Prompt engineering system 432 may retrieve and/or extract relevant policy thresholds regarding structural damage or public usability from unstructured data 434B. Moreover, prompt engineering system 432 may reformulate the natural language prompt as "Does the observed bench damage exceed the city's usability threshold for public infrastructure?" Vision language model 414 may process related visual evidence (e.g., image(s) from edge device(s) 104 or corresponding annotated images from object detection system 122a/122b) using the refined natural language prompt. To determine whether the observed state of the bench included in the visual evidence meets or exceeds the defined violation threshold.

In some configurations, compliance framework 400 may implement one or more self-supervised learning (SSL) operation(s) to enable a domain-specific AI/ML model, such as vision language model 414, to learn domain-specific patterns and/or compliance-related asset conditions without requiring manually labeled training data. In some examples, SSL operation(s) may include label-free training using time-series images or visual observations captured by edge device(s) 104. For example, images of a particular compliance-related asset (e.g., a waste bin) taken over time may reveal expected condition progressions, such as a bin gradually filling between scheduled cleanings. Vision language model 414 may use those images as training signals to model temporal trends and inform compliance assessments. Moreover, vision language model 414 may identifying deviations, such as abnormally rapid fill rates or persistently unserviced compliance-related assets based on these trends.

In some aspects, the SSL operation(s) may incorporate domain-informed expectations into the modeling of compliance-related asset conditions or compliance determinations over time. The domain-informed expectations may be based on contextual rules (e.g., policies, thresholds, or conditional logic extracted from unstructured data 434B (e.g., enforcement protocols, regulatory clauses) and/or structured data 434A (e.g., SLA parameters, zone-based service conditions) or service norms (e.g., operational expectations captured in SLA records or maintenance schedules from structured data 434A and/or unstructured data 434B). As described herein, domain-informed expectations may include assumptions or reference norms derived from jurisdiction-specific compliance practices, asset management routines, or operational service-level requirements.

For example, vision language model 414 may analyze historical pickup data and SLA logs associated with a specific bin asset ID to determine a domain-informed expectation that bins located in high-traffic public parks are typically serviced every 72 hours. The structured data 434A may include pickup timestamps, SLA performance logs, and compliance-related asset metadata (e.g., location, zone classification). In some instance, vision language model 414 may corroborate the domain-informed expectation with policy clause(s) extracted from unstructured data 434B stating that "bins in recreational zones must not exceed 85% capacity between scheduled pickups (3-day interval)." Based on the domain-informed expectation, vision language model 414 may learn to anticipate typical fill-level progression over time and flag early signs of overflow or service deviation without explicit violation labels. Further, vision language model 414 may leverage the domain-informed expectation to determine whether an observed asset condition (e.g., images of the asset obtained by the edge device(s) 104) is within the expected range or represents an anomaly. In some instances, vision language model 414 may perform progressive feature learning by observing how compliance-relevant attributes, such as overflow, degradation, or structural damage, emerge and evolve over time across monitored assets.

In some configurations, compliance framework 400 may further support implicit label generation as part of the SSL operation(s). For example, vision language model 414 may generate pseudo-labels by comparing predicted asset states against domain-informed expectations derived from structured data 434A and/or unstructured data 434B. If a prediction (e.g., "bin is full") aligns with the expected state (e.g., based on time since last pickup and fill trajectory), the model may reinforce its internal representations accordingly. Conversely, if the observed condition deviates significantly from expected trends (e.g., overflow after only 24 hours), the discrepancy may be used to generate alternative pseudo-labels for training or alert classification.

For example, vision language model 414 may analyze a time series of images for a specific bin captured by edge device(s) 104. Based on structured data 434A indicating that the bin is typically emptied every 72 hours and associated pickup logs confirming the last service date, vision language model 14 may expect a moderate fill level at the 48-hour mark. However, if the visual input at 48 hours shows significant trash accumulation spilling over the rim, vision language model 414 may assign a pseudo-label such as "premature overflow" to that data point. This pseudo-label may then be used for further model training to improve anomaly detection or SLA deviation recognition in similar cases. This implicit labeling capability enables vision language model 414 to learn from ongoing operational data and evolve its understanding of compliance-relevant conditions, such as capacity violations, obstruction severity, or asset deterioration, without requiring continuous human annotation.

In some configurations, compliance framework 400 may implement one or more prioritization operation(s) to rank, score, or classify compliance-related outputs generated in response to natural language prompts or queries. These prioritization operation(s) may produce a corresponding priority level for each output, thereby enabling compliance framework 400 to distinguish between higher-risk or time-sensitive issues and lower-severity conditions. The priority level may be determined based on factors such as severity, public impact, urgency, or policy-defined weights. In some examples, the priority level may be embedded within or associated with the output generated by a domain-specific AI/ML model, such as vision language model 414. In some cases, the domain-specific AI/ML model may generate outputs that include priority metadata, such as tags, labels, or attributes, based on the content of the visual input and the context of the refined or reformulated natural language query. For example, a natural language prompt may state, "Is this pothole dangerous in this image?" Vision language model 414 may evaluate the image and associated scene graph 434C (e.g., "pothole >12 inches deep located at school crosswalk"), and may assign a high-priority level, such as "Critical safety hazard: immediate repair required." This assigned priority level may be based on thresholds encoded in unstructured data 434B (e.g., a city ordinance defining potholes greater than 10 inches as hazards) and policy data managed by agency system(s) 130.

In some aspects, the prioritization operation(s) may use one or more inputs when assigning a priority level, including, but not limited to, structured data 434A (e.g., asset metadata indicating that the asset is located in a designated priority zone), scene graphs 434C (e.g., indicating proximity to sensitive sites such as schools or hospitals), and/or policy logic derived from unstructured data 434B (e.g., SLA clauses requiring resolution within defined time windows or imposing penalties for delayed responses).

In some instances, the prioritization operation(s) may incorporate structured data 434A to determine whether the compliance asset falls within a designated priority zone. As described herein, a priority zone may refer to a jurisdiction-defined area or context where policy, safety, or service urgency standards demand faster or more stringent enforcement. Examples of priority zones may include areas near hospitals, schools, critical infrastructure, high-traffic intersections, or parks. The structured data 434A may include asset location coordinates, zoning classifications, and linked policy requirements. Based on this structured data, prompt engineering system 432 may adjust the priority level for a detected issue. For example, prompt engineering system 432 may refine or reformulate a natural language prompt associated with graffiti near a school to include information that elevates the associated priority level compared to a similar issue near an industrial zone.

In some cases, the prioritization operation(s) may use semantic relationships encoded in scene graphs 434C to infer contextual urgency and adjust the corresponding priority level. For example, a scene graph describing "trash spilling next to playground equipment" may indicate elevated risk due to proximity to a child-accessible recreational area. Prompt engineering system 432 may identify this relationship and reformulate the prompt accordingly (e.g., "Does this overflowing bin pose a health hazard near the playground?"). In response, vision language model 414 may generate an output with a high-priority level indicating a time-sensitive compliance condition.

In some examples, the prioritization operation(s) may incorporate policy logic or escalation thresholds derived from unstructured data 434B and managed by agency system(s) 130 to determine the priority level. For example, a service-level agreement (SLA) may specify that "overflowing waste bins in city zones must be addressed within 12 hours or incur penalty." Prompt engineering system 432 may retrieve this SLA clause and embed it into the reformulated natural language prompt. If vision language model 414 detects a corresponding condition (e.g., a bin 93% full and last serviced 18 hours ago), it may generate a response that includes a priority flag indicating a high-priority level, such as "Urgent: SLA violation likely."

As described herein, agency system(s) 130 may use the priority levels assigned by compliance framework 400 to initiate or coordinate differentiated compliance workflows. For example, in response to a high-priority output, such as one flagged as a critical safety hazard or a likely SLA violation, agency system(s) 130 may automatically trigger time-sensitive operational actions. These may include the issuance of real-time alerts, dispatch of maintenance or enforcement personnel, generation of automated citations, or creation of expedited work orders. Conversely, lower-priority outputs, such as minor aesthetic issues or non-urgent maintenance conditions, may be deferred for routine inspection cycles, batch processing, or long-term scheduling. In some implementations, the assigned priority level may influence queue ordering, escalation logic, or resource allocation strategies. By embedding and operationalizing priority metadata, agency system(s) 130 can enforce differentiated compliance workflows that align with policy mandates, risk thresholds, and service-level performance objectives.

In some configurations, compliance framework 400 may implement one or more explainability operation(s) to enable transparent, interpretable, and auditable outputs generated by components such as a domain-specific AI/ML model (e.g., vision language model 414) and/or prompt engineering system 432. Explainability may refer to the ability of the compliance framework 400, such as the domain-specific AI/ML model and/or prompt engineering system 432, to provide human-understandable justifications for its outputs, such as classifications, responses, or decisions, particularly in the context of compliance-related tasks. For example, the explainability operation(s) may include generating natural language justifications alongside the primary output of vision language model 414.

In some examples, the justification(s) may cite the specific visual cues, domain-specific policies (e.g., from unstructured data 434B), and contextual metadata (e.g., from structured data 434A) that contributed to the reasoning of the domain-specific AI/ML model (e.g., vision language model 414). For example, when responding to the refined natural language query "Is this bus stop structurally damaged?" vision language model 414 may output "Yes, cracked canopy and detached bench leg detected," along with a justification such as "Damage severity exceeds repair threshold per SLA policy T-402."

In some cases, compliance framework 400 may reference machine policy understanding (MPU) operation(s) to identify the specific policy clause(s) that inform the output of the domain-specific AI/ML model (e.g., vision language model 414). These policy clause(s) may be presented to the user as part of the output, enabling reviewers (e.g., via agency system(s) 130) to trace each decision back to a policy source. This traceability supports regulatory compliance audits, internal reviews, and appeals processes.

In some aspects, the explainability operation(s) may include generating overlay visualizations (e.g., bounding boxes, scene graph relationships, or segmentation masks) to visually indicate the compliance-relevant evidence supporting a conclusion. These visual annotations may be included in evidence packages or compliance reports generated by cloud compliance engine 416 and/or edge compliance engine 418 and transmitted to agency system(s) 130 for further review or downstream actions.

In some instances, compliance framework 400 may use prior prompt embeddings and output embeddings (e.g., from embeddings index 434D) to retrieve similar historical cases and present them alongside the current output. These retrieved cases may include the previously submitted prompt, the AI/ML-generated output, and the associated evidence, enabling contextual comparison.

In some configurations, compliance framework 400 may implement one or more auditability operation(s) to ensure that outputs generated by components such as a domain-specific AI/ML model (e.g., vision language model 414), prompt engineering system 432, and other subsystems within query system(s) 126a can be reviewed, traced, and validated after initial inference. As described herein, auditability may refer to the capacity of compliance framework 400 to maintain detailed records of compliance determinations, prompt transformations, model outputs, and supporting evidence to enable post-hoc review and regulatory transparency.

In some examples, auditability operation(s) may include logging each component involved in a given compliance determination, including but not limited to, the natural language prompt submitted by a user (e.g., from agency device(s) 132A-132N), any prompt refinements performed by prompt engineering system 432, the scene graphs 434C or structured data 434A consulted during reasoning, the retrieved unstructured data 434B or extracted policy clauses via MPU operation(s), and the output and any visual annotations generated by a domain-specific AI/ML model (e.g., vision language model 414). These artifacts may be stored in contextual knowledge database(s) 434, for example in association with embeddings index 434D, or in a designated audit log repository managed by agency system(s) 130. Each stored artifact may include metadata such as timestamps, asset identifiers, query versioning, and user interaction history to support traceability and regulatory review. [0162]n some examples, compliance framework 400 may implement one or more auditability operation(s) that associate system outputs with one or more audit trails or digital records. The audit trails may be generated and logged by one or more components of compliance framework 400, including, for example, prompt engineering system 432, a domain-specific AI/ML model, such as, vision language model 414, and/or agency system(s) 130. For example, prompt engineering system 432 may log the original and refined versions of a user-submitted natural language query, as well as the domain-specific context or retrieved clauses used for prompt construction. Vision language model 414 may log its inference steps, such as the input image it processed, the visual reasoning paths taken (e.g., object relationships or detection overlays), and the compliance conclusion it reached. Agency system(s) 130 may record metadata associated with the output, such as jurisdiction, query timestamp, model version, and user ID. These audit trails may be stored in contextual knowledge database(s) 434 or in dedicated audit log repositories associated with agency system(s) 130. The combined log record may support reproducibility, explainability, and post hoc inspection of system behavior across a wide range of compliance scenarios.

In some aspects, the auditability operation(s) may support differential access controls and role-based visibility. For example, municipal reviewers, legal auditors, or service providers may each be granted permission to view specific portions of the audit trail, such as underlying policy rules, decision thresholds, or visual metadata depending on their responsibilities and clearance levels. Agency system(s) 130 may manage this access control. Further, the auditability operation(s) may enable compliance framework 400 to compare outputs across different model versions, prompt formulations, or time periods. In some examples, version control metadata may be stored alongside each embedding or response, enabling evaluators to track how model behavior evolves, whether outputs are consistent over time, and whether refinements (e.g., new policy clauses or updated prompt templates) impact compliance determinations.

Figure 5:
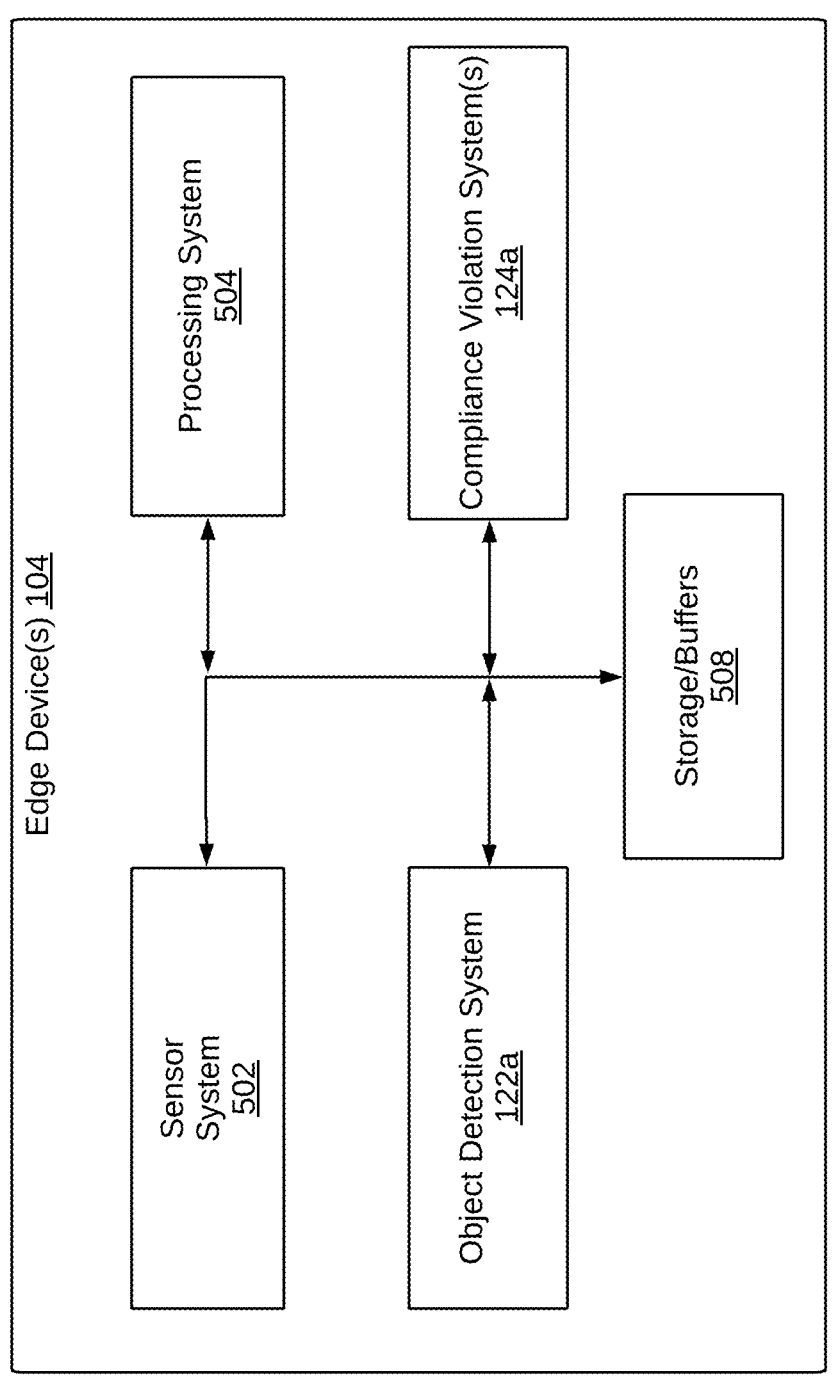
FIG. 5 illustrates a block diagram of an edge device, according to some examples of the present disclosure.

FIG. 5 illustrates a block diagram of an example of the edge device(s) 104, according to some aspects of the present disclosure. In FIG. 5, the edge device(s) 104 represents a single edge device. Moreover, the edge device(s) 104 in FIG. 5 may include a sensor system 502, a processing system 504, and storage/buffers 508. In some instances, sensor system 502 may include one or more sensors, such as optical sensors (e.g., Charge-Couple Device Sensors (CCD Sensors), Complementary Metal-Oxide Semiconductor (CMOS) sensors, Single Photon Avalanche Diode (SPAD) sensors, OMNIVISION image sensors, etc.)

In some cases, edge device(s) 104 may include an object detection system 122a and/or a context system 124b. In some examples, object detection system 122a may be a localized version, a client-side version, a standalone version, and/or a lightweight version of object detection system 122b implemented at the system server(s) 120. For instance, the localized version may be designed to operate with reduced data size, fewer components, features, functions, modules, libraries, or capabilities, or a smaller code package relative to object detection system 122b hosted at the system server(s) 120.

In some aspects, context system 124a may be a localized version, a client-side version, a standalone version, and/or a lightweight version of context system 124b implemented at the system server(s) 120. For instance, the localized version may be designed to operate with reduced data size, fewer components, features, functions, modules, libraries, or capabilities, or a smaller code package relative to context system 124b hosted at the cloud server(s) 120.

FIG. 6 is a flowchart for a method 600 for identifying and/or monitoring a compliance matter, according to some examples of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 1. However, method 600 is not limited to those examples.

In step 602, the method 600 includes obtaining, from one or more image sensors, a first set of image data corresponding to an environment. For example, edge device(s) 104 can use sensor system 502 to obtain a first set of image data corresponding to an environment. As an example, the image data can include image 200 illustrated in FIG. 2A.

In step 604, the method 600 includes processing the first set of image data using a first machine learning algorithm to yield annotated image data that identifies at least one object within the environment. In some cases, the first machine learning algorithm can correspond to an object detection model. For instance, edge device(s) 104 can use object detection system 122*a* and/or cloud server(s) 120 can use object detection system 122*b* to process the first set of image data using a machine learning algorithm for performing object detection. In some cases, the annotated image data can include a label, bounding box coordinates, and/or a confidence score. For instance, the annotated image data can include a label identifying stop sign 202 in image 200 and bounding box coordinates that correspond to the location of stop sign 202.

In step 606, the method 600 includes processing the annotated image data using a second machine learning algorithm to determine one or more attributes associated with the at least one object within the environment. In some cases, the second machine learning algorithm can correspond to a vision language model (VLM). For example, edge device(s) 104 can use context system 124*a* and/or cloud server(s) 120 can use context system 124*b* to process the annotated image data to determine one or more attributes associated with the object. In one example, the annotated image data corresponding to image 200 can be processed to determine that stop sign 202 has collapsed.

In step 608, the method 600 includes generating, based on the one or more attributes, an evidence package corresponding to the at least one object within the environment, wherein the evidence package includes one or more action items associated with the at least one object. For instance, an evidence package can be generated that indicates that stop sign 202 in image 200 is collapsed and is in urgent need of repair because it is blocking a roadway. In some examples, the evidence package can correspond to at least one a safety compliance matter, a regulatory compliance matter, a service compliance matter, a traffic compliance matter, a permit compliance matter, and a community compliance matter.

In some examples, the method 600 can include obtaining, from one or more image sensors, a second set of image data corresponding to the environment; processing the second set of image data to identify a change in the one or more attributes associated with the at least one object within the environment; and determining, based on the change in the one or more attributes, that the one or more action items are complete. For example, edge device(s) 104 can obtain image 204 corresponding to the same environment as image 200. In some cases, edge device(s) 104 and/or cloud server(s) 120 can process image 204 to determine that the stop sign 202 is standing correctly, which indicates that the repair was completed.

In some instances, the method 600 can include capturing the first set image data in response to a trigger condition. For example, edge device(s) 104 can capture image 200 and/or image 204 in response to a trigger condition. In some cases, the trigger condition may include a request from an agency. In some examples, the trigger condition may include periodic monitoring of an environment.

In some cases, the method 600 can include sending the first set of image data from an edge device to a cloud server, wherein the cloud server is configured to implement at least one of the first machine learning algorithm and the second machine learning algorithm. For example, edge device(s) 104 can send the image data to cloud server(s) 120.

In some configurations, the method 600 can include sending the evidence package to a third-party system corresponding to an entity that is responsible for addressing the one or more action items. For example, edge device(s) 104 and/or cloud server(s) 120 can send the evidence package to agency system(s) 130.

FIG. 7 is a flowchart for a method 700 for refining a natural language query using scene graphs, according to some examples of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

At step 702, prompt engineering system 432 may obtain the natural language query related to a compliance-related matter, such as an object, structure, environmental condition, or other visual indicator associated with a compliance-related matter. In some examples, the natural language query may be received from an agency device, such as agency device 132A, operated by an authorized user. For example, a user may submit a query stating, "Is this sidewalk blocked in the image?"

At step 704, prompt engineering system 432 may access one or more scene graphs 434C stored in contextual knowledge database(s) 434 that correspond to the image (e.g., visual scene) and/or queried compliance-related assets (e.g., object(s)) referenced in the natural language query. In the above example, the scene graph may indicate "vegetation overgrowth obstructing sidewalk," with objects such as "vegetation" and "sidewalk" connected by the relationship "obstructing."

At step 706, prompt engineering system 432 may retrieve corresponding domain-related policy data from unstructured data 434B or structured data 434A based on the relationships identified in the scene graph(s). As described herein, the domain-related policy data may include one or more policy clauses, thresholds, and/or regulatory conditions, among others. In the above example, prompt engineering system 432 may retrieve a clause from unstructured data 434B stating "36-inch minimum pedestrian clearance required for ADA compliance."

At step 708, prompt engineering system 432 may generate a refined natural language query based on one or more portions of the domain-related policy data and the natural language query.

In some examples, prompt engineering system 432 may generate the refined natural language query by injecting the one or more portions of the domain-related policy data into the natural language query. In the above example, the refined query may be "Does this obstruction reduce sidewalk clearance below 36 inches in violation of ADA requirement S-106?" The refined query may then be provided to vision language model 414 for compliance-aware processing, resulting in an output such as, "Clearance is reduced to 28 inches; sidewalk does not meet ADA compliance threshold."

In some examples, the refined natural language query generated by prompt engineering system 432 may be provided to a domain-specific AI/ML model, such as vision language model 414, for processing. Based on the refined query and associated visual and contextual data, the domain-specific AI/ML model may generate a compliance-aware output that can be used in subsequent operations, such as verification of compliance violations, prioritization based on severity or impact, and determination of potential corrective actions by agency system(s) 130.

Example Neural Network Architectures

Figure 8:
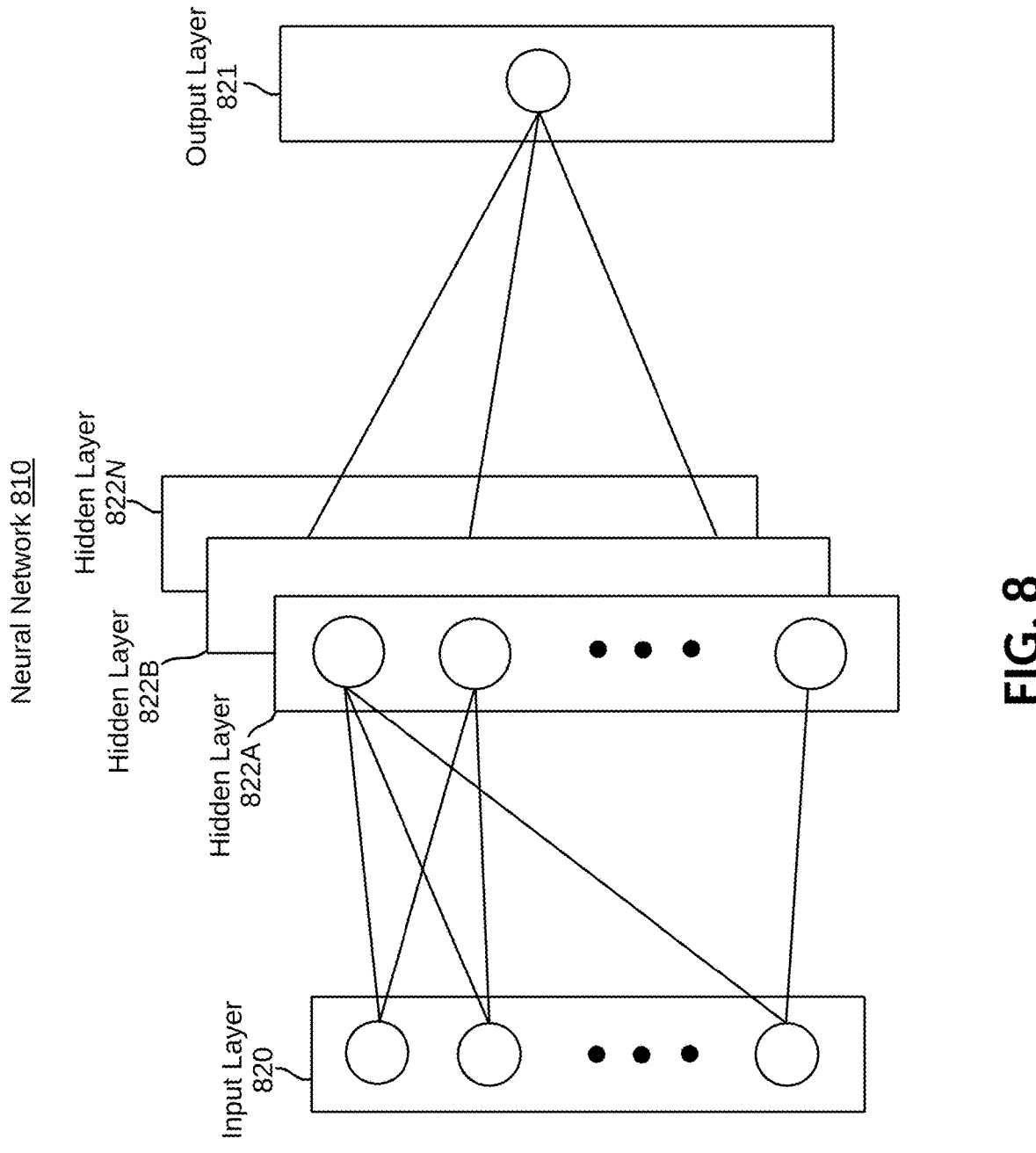
FIG. 8 is a diagram illustrating an example of a neural network architecture, according to some examples of the present disclosure.

FIG. 8 is a diagram illustrating an example architecture 800 of an example neural network 810. The example architecture 800 can be used to implement any neural network described herein and/or any components described herein that can include or implement a neural network. For example, the architecture 800 can be used to implement a neural network(s) of the object detection system 122a, object detection system 122b, context system 124a, context system 124b, and/or any portion thereof.

The architecture 800 of the neural network 810 can include an input layer 820 that can be configured to receive and process data to generate one or more outputs. The architecture 800 of the neural network 810 can also include hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The architecture 800 of the neural network 810 can further include an output layer 821 that provides an output resulting from the processing performed by the hidden layers 822a, 822b, through 822n.

The neural network 810 is a multi-layer neural network of interconnected nodes. Each node can represent a piece of information. Information associated with the nodes is shared among the different layers and each layer retains information as information is processed. In some cases, the neural network 810 can include a feed-forward network, in which case there are no feedback connections where outputs of the network are fed back into itself. In some cases, the neural network 810 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the first hidden layer 822a can transform the information of each input node by applying activation functions to the input node information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 821, at which an output is provided. In some cases, while nodes in the neural network 810 are shown as having multiple output lines, a node can have a single output and all lines shown as being output from a node represent the same output value.

In some cases, each node or interconnection between nodes can have a weight that is a set of parameters derived from the training of the neural network 810. Once the neural network 810 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network 810 to be adaptive to inputs and able to learn as more and more data is processed.

The neural network 810 is pre-trained to process the features from the data in the input layer 820 using the different hidden layers 822a, 822b, through 822n in order to provide the output through the output layer 821.

In some cases, the neural network 810 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 810 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as $E\_total=\Sigma(\frac{1}{2} \text{(target-output)}^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 810 can perform a backward pass by determining which inputs (weights) most contributed to the loss of the network and can adjust the weights so that the loss decreases and is eventually minimized.

The neural network 810 can include any suitable deep network. One example neural network includes a transformer network, which can be used to implement a large language model.

Another example neural network includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 810 can include any other deep network other than a transformer or CNN, such as an encoder-decoder network, an encoder-only network, a decoder-only network, a mixture of experts (MoE) network, a generative model network, an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 9:
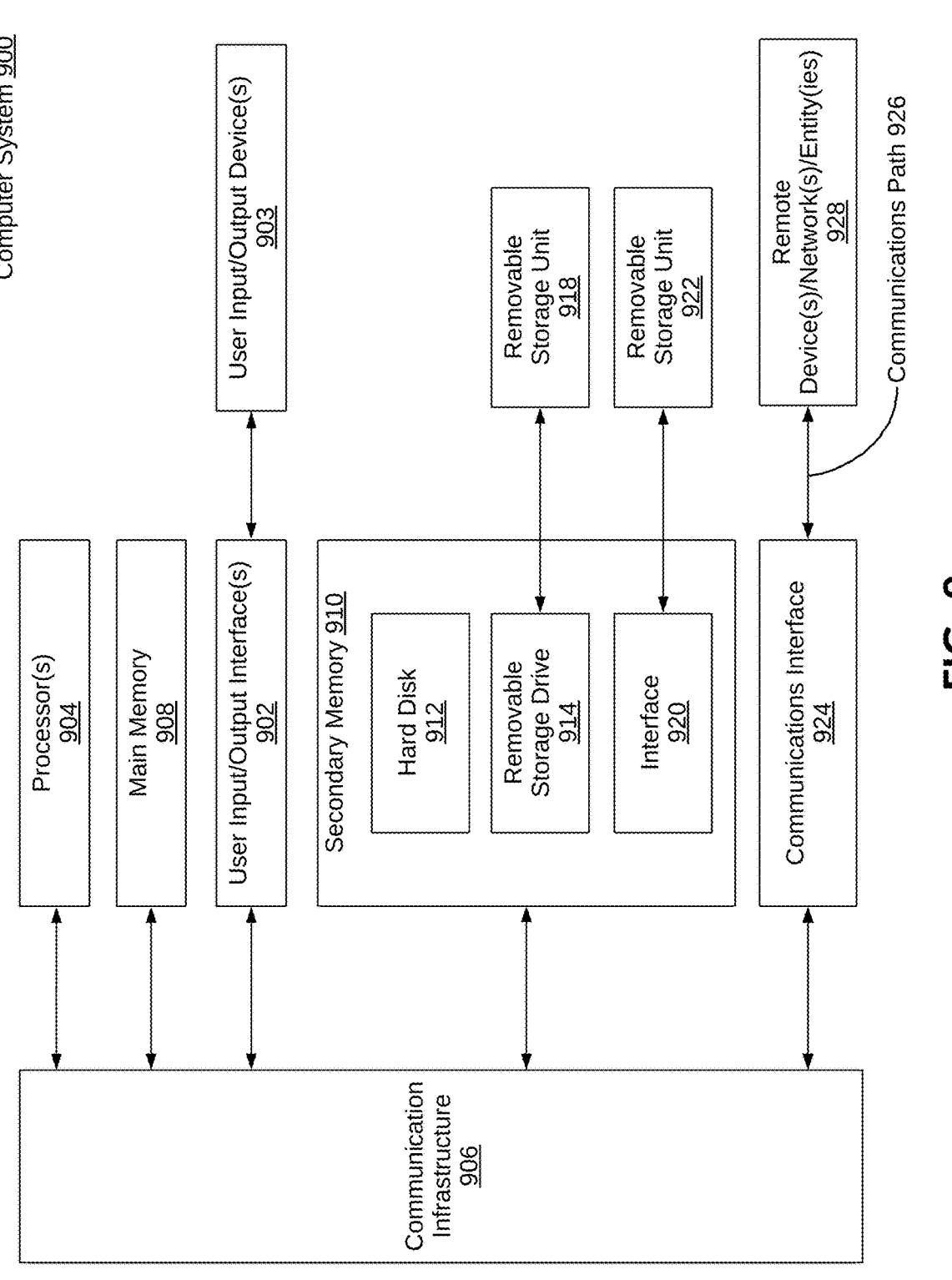
FIG. 9 illustrates an example computer system that can be used for implementing various aspects of the present disclosure.

Various aspects and examples may be implemented, for example, using one or more well-known computer systems, such as computer system 900 shown in FIG. 9. For example, the edge device(s) 104 may be implemented using combinations or sub-combinations of computer system 900. Also, or alternatively, one or more computer systems 900 may be used, for example, to implement any of the aspects and examples discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random-access memory (RAM). Main memory 908 may include one or more levels of cache. Main memory 908 may have stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 900 may include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900 or processor(s) 904), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more, but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Examples of the Disclosure Include

Aspect 1. A computer-implemented method comprising: obtaining, from one or more image sensors, a first set of image data corresponding to an environment; processing the first set of image data using a first machine learning algorithm to yield annotated image data that identifies at least one object within the environment; processing the annotated image data using a second machine learning algorithm to determine one or more attributes associated with the at least one object within the environment; and generating, based on the one or more attributes, an evidence package corresponding to the at least one object within the environment, the evidence package being configured to facilitate a determination of one or more action items associated with the at least one object.

Aspect 2. The computer-implemented method of Aspect 1, further comprising: providing the evidence package to a computing system, the computing system implementing one or more operations to determine the one or more action items based on the evidence package.

Aspect 3. The computer-implemented method of any of Aspects 1 to 2, further comprising: obtaining, from one or more image sensors, a second set of image data corresponding to the environment; processing the second set of image data to identify a change in the one or more attributes associated with the at least one object within the environment; and determining, based on the change in the one or more attributes, that the one or more action items associated with the at least one object are complete.

Aspect 4. The computer-implemented method of any of Aspects 1 to 3, further comprising: capturing the first set of image data in response to a trigger condition.

Aspect 5. The computer-implemented method of any of Aspects 1 to 4, wherein the evidence package corresponds to at least one of a safety compliance matter, a regulatory compliance matter, a service compliance matter, a traffic compliance matter, a permit compliance matter, and a community compliance matter.

Aspect 6. The computer-implemented method of any of Aspects 1 to 5, wherein the first machine learning algorithm corresponds to an object detection model and the second machine learning algorithm corresponds to a vision language model (VLM).

Aspect 7. The computer-implemented method of Aspect 6, wherein the second machine learning processes the annotated image data to determine the one or more attributes based on domain relevant data stored in the one or more contextual knowledge databases.

Aspect 8. The computer-implemented method of any of Aspects 1 to 7, further comprising: sending the first set of image data from an edge device to a cloud server, wherein the cloud server is configured to implement at least one of the first machine learning algorithm and the second machine learning algorithm.

Aspect 9. The computer-implemented method of any of Aspects 1 to 8, further comprising: sending the evidence package to a third-party system corresponding to an entity that is responsible for addressing the one or more action items.

Aspect 10. A system comprising: at least one memory; and at least one processor coupled to the at least one memory, the at least one processor is configured to perform operations comprising: obtaining, from one or more image sensors, a first set of image data corresponding to an environment; processing the first set of image data using a first machine learning algorithm to yield annotated image data that identifies at least one object within the environment; processing the annotated image data using a second machine learning algorithm to determine one or more attributes associated with the at least one object within the environment; and generating, based on the one or more attributes, an evidence package corresponding to the at least one object within the environment, the evidence package being configured to facilitate a determination of one or more action items associated with the at least one object.

Aspect 11. The system of Aspect 10, wherein the at least one processor is configured to perform operations further comprising: providing the evidence package to a computing system, the computing system implementing one or more operations to determine the one or more action items based on the evidence package.

Aspect 12. The system of any of Aspects 10 to 11, wherein the at least one processor is configured to perform operations further comprising: obtaining, from one or more image sensors, a second set of image data corresponding to the environment; processing the second set of image data to identify a change in the one or more attributes associated with the at least one object within the environment; and determining, based on the change in the one or more attributes, that the one or more action items associated with the at least one object are complete.

Aspect 13. The system of any of Aspects 10 to 12, wherein the at least one processor is configured to perform operations further comprising: capturing the first set of image data in response to a trigger condition.

Aspect 14. The system of any of Aspects 10 to 13, wherein the evidence package corresponds to at least one of a safety compliance matter, a regulatory compliance matter, a service compliance matter, a traffic compliance matter, a permit compliance matter, and a community compliance matter.

Aspect 15. The system of any of Aspects 10 to 14, wherein the first machine learning algorithm corresponds to an object detection model and the second machine learning algorithm corresponds to a vision language model (VLM).

Aspect 16. The system of any of Aspects 10 to 15, wherein the at least one processor is configured to perform operations further comprising: providing the first set of image data from an edge device to a cloud server, wherein the cloud server is configured to implement at least one of the first machine learning algorithm and the second machine learning algorithm.

Aspect 17. The system of any of Aspects 10 to 16, wherein the at least one processor is configured to perform operations further comprising: providing the evidence package to a third-party system corresponding to an entity that is responsible for addressing the one or more action items.

Aspect 18. A non-transitory computer-readable medium having instructions stored thereon that, when executed by at least one computing device, causes the at least one computing device to perform operations comprising: obtaining, from one or more image sensors, a first set of image data corresponding to an environment; processing the first set of image data using a first machine learning algorithm to yield annotated image data that identifies at least one object within the environment; processing the annotated image data using a second machine learning algorithm to determine one or more attributes associated with the at least one object within the environment; and generating, based on the one or more attributes, an evidence package corresponding to the at least one object within the environment, the evidence package being configured to facilitate a determination of one or more action items associated with the at least one object.

Aspect 19. The non-transitory computer-readable medium of Aspect 18, wherein the at least one computing device further performs operations comprising: providing the evidence package to a computing system, the computing system implementing one or more operations to determine the one or more action items based on the evidence package.

Aspect 20. The non-transitory computer-readable medium of any of Aspects 18 to 19, wherein the at least one computing device further performs operations comprising: obtaining, from one or more image sensors, a second set of image data corresponding to the environment; processing the second set of image data to identify a change in the one or more attributes associated with the at least one object within the environment; and determining, based on the change in the one or more attributes, that the one or more action items associated with the at least one object are complete.

What is claimed is:

1. A computer-implemented method comprising:

obtaining, from one or more image sensors, a first set of image data corresponding to an environment;

processing the first set of image data using a first machine learning algorithm to yield annotated image data that identifies at least one object within the environment;

processing the annotated image data using a second machine learning algorithm to determine one or more attributes associated with the at least one object within the environment;

generating, based on the one or more attributes, an evidence package corresponding to the at least one object within the environment, the evidence package being configured to facilitate a determination of one or more action items associated with the at least one object;

obtaining, from one or more image sensors, a second set of image data corresponding to the environment;

processing the second set of image data to identify a change in the one or more attributes associated with the at least one object within the environment; and determining, based on the change in the one or more attributes, that the one or more action items associated with the at least one object are complete.

2. The computer-implemented method of claim 1, further comprising:

providing the evidence package to a computing system, the computing system implementing one or more operations to determine the one or more action items based on the evidence package.

3. The computer-implemented method of claim 1, further comprising:

capturing the first set of image data in response to a trigger condition.

4. The computer-implemented method of claim 1, wherein the evidence package corresponds to at least one of a safety compliance matter, a regulatory compliance matter, a service compliance matter, a traffic compliance matter, a permit compliance matter, and a community compliance matter.

5. The computer-implemented method of claim 1, wherein the first machine learning algorithm corresponds to an object detection model and the second machine learning algorithm corresponds to a vision language model (VLM).

6. The computer-implemented method of claim 5, wherein the second machine learning algorithm the annotated image data to determine the one or more attributes based on domain relevant data stored in one or more contextual knowledge databases.

7. The computer-implemented method of claim 1, further comprising:

sending the first set of image data from an edge device to a cloud server, wherein the cloud server is configured to implement at least one of the first machine learning algorithm and the second machine learning algorithm.

8. The computer-implemented method of claim 1, further comprising:

sending the evidence package to a third-party system corresponding to an entity that is responsible for addressing the one or more action items.

9. A system comprising:

at least one memory; and at least one processor coupled to the at least one memory, the at least one processor is configured to perform operations comprising:

obtaining, from one or more image sensors, a first set of image data corresponding to an environment;

processing the first set of image data using a first machine learning algorithm to yield annotated image data that identifies at least one object within the environment;

processing the annotated image data using a second machine learning algorithm to determine one or more attributes associated with the at least one object within the environment;

generating, based on the one or more attributes, an evidence package corresponding to the at least one object within the environment, the evidence package being configured to facilitate a determination of one or more action items associated with the at least one object;

obtaining, from one or more image sensors, a second set of image data corresponding to the environment;

processing the second set of image data to identify a change in the one or more attributes associated with the at least one object within the environment; and determining, based on the change in the one or more attributes, that the one or more action items associated with the at least one object are complete.

10. The system of claim 9, wherein the at least one processor is configured to perform operations further comprising:

providing the evidence package to a computing system, the computing system implementing one or more operations to determine the one or more action items based on the evidence package.

11. The system of claim 9, wherein the at least one processor is configured to perform operations further comprising:

capturing the first set of image data in response to a trigger condition.

12. The system of claim 9, wherein the evidence package corresponds to at least one of a safety compliance matter, a regulatory compliance matter, a service compliance matter, a traffic compliance matter, a permit compliance matter, and a community compliance matter.

13. The system of claim 9, wherein the first machine learning algorithm corresponds to an object detection model and the second machine learning algorithm corresponds to a vision language model (VLM).

14. The system of claim 9, wherein the at least one processor is configured to perform operations further comprising:

providing the first set of image data from an edge device to a cloud server, wherein the cloud server is configured to implement at least one of the first machine learning algorithm and the second machine learning algorithm.

15. The system of claim 9, wherein the at least one processor is configured to perform operations further comprising:

providing the evidence package to a third-party system corresponding to an entity that is responsible for addressing the one or more action items.

16. A non-transitory computer-readable medium having instructions stored thereon that, when executed by at least one computing device, causes the at least one computing device to perform operations comprising:

obtaining, from one or more image sensors, a first set of image data corresponding to an environment;

processing the first set of image data using a first machine learning algorithm to yield annotated image data that identifies at least one object within the environment;

processing the annotated image data using a second machine learning algorithm to determine one or more attributes associated with the at least one object within the environment;

generating, based on the one or more attributes, an evidence package corresponding to the at least one object within the environment, the evidence package being configured to facilitate a determination of one or more action items associated with the at least one object;

obtaining, from one or more image sensors, a second set of image data corresponding to the environment;

processing the second set of image data to identify a change in the one or more attributes associated with the at least one object within the environment; and determining, based on the change in the one or more attributes, that the one or more action items associated with the at least one object are complete.

17. The non-transitory computer-readable medium of claim 16, wherein the at least one computing device further performs operations comprising:

providing the evidence package to a computing system, the computing system implementing one or more operations to determine the one or more action items based on the evidence package.

* * * * *